(12) United States Patent
Trumper et al.

(10) Patent No.: US 8,358,039 B2
(45) Date of Patent: Jan. 22, 2013

(54) HIGH-SCAN RATE POSITIONER FOR SCANNED PROBE MICROSCOPY

(75) Inventors: David L. Trumper, Plaistow, NH (US); Ian MacKenzie, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 737 days.

(21) Appl. No.: 12/581,135

(22) Filed: Oct. 17, 2009

(65) Prior Publication Data

US 2010/0100990 A1    Apr. 22, 2010

Related U.S. Application Data

(60) Provisional application No. 61/106,546, filed on Oct. 17, 2008.

(51) Int. Cl.
*H02K 41/00* (2006.01)
(52) U.S. Cl. ............... 310/12.06; 310/12.22; 310/12.24; 310/12.29; 310/12.31; 850/3
(58) Field of Classification Search ............... 310/12.04, 310/12.05, 12.06, 12.21, 12.22, 12.24, 12.25, 310/12.29, 12.31; 850/1, 2, 3; 977/851
See application file for complete search history.

(56) References Cited

U.S. PATENT DOCUMENTS

| | | | | | |
|---|---|---|---|---|---|
| 6,107,703 | A | * | 8/2000 | Korenaga | 310/12.06 |
| 6,130,490 | A | * | 10/2000 | Lee | 310/12.06 |
| 6,265,793 | B1 | * | 7/2001 | Korenaga | 310/12.06 |
| 6,445,093 | B1 | * | 9/2002 | Binnard | 310/12.06 |
| 7,067,942 | B2 | * | 6/2006 | Korenaga et al. | 310/12.25 |
| 7,385,318 | B2 | * | 6/2008 | Hirata | 310/12.06 |
| 2005/0248219 | A1 | * | 11/2005 | Korenaga | 310/12 |
| 2006/0082225 | A1 | * | 4/2006 | Korenaga et al. | 310/12 |
| 2007/0267920 | A1 | * | 11/2007 | Korenaga | 310/12 |
| 2009/0058199 | A1 | * | 3/2009 | Ito | 310/12 |
| 2009/0263747 | A1 | * | 10/2009 | Coakley et al. | 430/311 |
| 2010/0100990 | A1 | * | 4/2010 | Trumper et al. | 850/8 |
| 2011/0241449 | A1 | * | 10/2011 | Aoyama et al. | 310/12.05 |

* cited by examiner

*Primary Examiner* — Quyen Leung
*Assistant Examiner* — David Scheuermann
(74) *Attorney, Agent, or Firm* — Peter A. Nieves; Sheehan Phinney; Bass + Green PA

(57) ABSTRACT

A system contains a first actuator half containing a first pair of actuator coils and a second pair of actuator coils located above the first pair of actuator coils, wherein the first pair of actuator coils is connected to a first metallic backing. A second actuator half is also providing within the system, which contains a first pair of actuator coils and a second pair of actuator coils located above the first pair of actuator coils, wherein the first pair of actuator coils is connected to a second metallic backing. The system also contains a mechanical flexure suspension having at least one flexure supporting a permanent magnet that is capable of moving, wherein the mechanical flexure suspension is located between the first actuator half and the second actuator half.

10 Claims, 44 Drawing Sheets x-axis scale

22 backside of flexure z-axis scale on backside

HIGH-SCAN RATE POSITIONER FOR SCANNED PROBE MICROSCOPY

CROSS-REFERENCE TO RELATED APPLICATION

This application claims priority to copending U.S. Provisional Application entitled, "HIGH-SCAN RATE POSITIONER FOR SCANNED PROBE MICROSCOPY," having Ser. No. 61/106,546, filed Oct. 17, 2008, which is entirely incorporated herein by reference.

FIELD OF THE INVENTION

The present invention is generally related to scanners, and more particularly is related to high speed, two degrees of freedom, scanners.

BACKGROUND OF THE INVENTION

Scanning Probe Microscopy (SPM) is a type of microscopy that creates images of surfaces using a probe that scans a specimen. The types of specimens that may be used vary vastly. As an example, a specimen may include a surface of a semiconductor wafer. An image of the surface is obtained by mechanically moving the probe to scan the specimen and recording probe-surface interaction as a function of position.

As previously mentioned, in conventional SPM, as the name implies, an image is obtained by scanning a probe across a sample surface. Typically, there is a fast scan axis (x axis) and a slow scan axis (y axis). As the probe traverses the surface, height (z) measurements of the sample are taken. This is often done via a feedback loop that keeps the spacing between the probe and surface at some constant value. The z measurement is then taken to be the probe displacement (or sample displacement) required to keep this spacing constant. The x and y positions of the probe relative to the sample are also measured as the probe scans; thus an array of (x, y, z) points are obtained and a 3-dimensional (3D) image of the sample surface can be reconstructed.

SPM technology thus requires movement in three degrees of freedom (3 DOF) (x, y, and z). Different manifestations of SPM achieve this in various ways. In moving probe/stationary sample configurations, the probe is attached to a scanner that provides both the x and y-axis scans as well as the vertical height following capability (z axis), while the sample remains stationary. This configuration is illustrated by the schematic diagram of FIG. 1, where a scanner 2, having a probe 4, has three degrees of freedom, and a sample stage 6 is stationary. Alternatively, in stationary probe/moving sample configurations, the opposite is true. Specifically, as illustrated in FIG. 2, the sample stage 6 is capable of providing travel in all three axes while the scanner 2, with probe 4, is stationary. Still further, as illustrated by the schematic diagram of FIG. 3, mixed configurations provide travel capabilities in one or more axes on both the scanner 2, with probe 4, and a sample stage 6.

The primary advantage of SPM is its resolution potential. SPM technologies, such as Atomic Force Microscopy (AFM) and Scanning Tunneling Microscopy (STM), can achieve subnanometer resolution. As an example, an AFM can provide nanometer-scale resolution images of a variety of surfaces. The high-resolution capability makes AFMs a promising technology for dimensional metrology of artifacts, such as semiconductor integrated circuits and photomasks. However, many AFMs do not provide sufficiently accurately calibrated axes of measurement. Further, to allow cost-effective use of an AFM in on-line measurement processes, it is necessary to achieve high imaging rates, and thereby high scan rates of an AFM scanning tip.

Unfortunately, scanning a sample surface can take a considerable amount of time, especially when very high resolution is desired. When attempting to scan very rapidly, retaining high resolution and high accuracy are formidable challenges.

Thus, a heretofore unaddressed need exists in the industry to address the aforementioned deficiencies and inadequacies.

SUMMARY OF THE INVENTION

Embodiments of the present invention provide a system and method for providing a high scan rate for scan probe microscopy. Briefly described, in architecture, one embodiment of the system, among others, can be implemented as follows. The system contains a first actuator half containing a first pair of actuator coils and a second pair of actuator coils located above the first pair of actuator coils, wherein the first pair of actuator coils is connected to a first metallic backing. A second actuator half is also providing within the system, which contains a first pair of actuator coils and a second pair of actuator coils located above the first pair of actuator coils, wherein the first pair of actuator coils is connected to a second metallic backing. The system also contains a mechanical flexure suspension having at least one flexure supporting a permanent magnet that is capable of moving, wherein the mechanical flexure suspension is located between the first actuator half and the second actuator half.

Other systems and features of the present invention will be or become apparent to one with skill in the art upon examination of the following drawings and detailed description. It is intended that all such additional systems and features be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present scanner configuration addresses the need for high-speed scanning with high resolution and high accuracy capabilities. The assumption behind the present scanner system design is that it would be used in a mixed SPM configuration, although it should be noted that the present invention is not intended to be limited to a mixed SPM configuration only. In accordance with the present invention, the scanner is intended to move the probe in a fast scan axis (x) and in a sample-normal axis (z). The sample itself is mounted on a stage capable of providing scan motions in a slow scan axis (y).

As a non-limiting example, in metrology application of SPM, a sample being imaged is often a large silicon wafer, perhaps, for example, three-hundred mm in diameter. This makes a moving sample/stationary probe configuration infeasible due to the difficulty of moving such a large mass at high scan speeds and correspondingly high accelerations. Conversely, the probe can be made very small, which is conducive to having the fast scan axis on a scanner. The z-axis is also required to have a high bandwidth so that the scanner can adequately follow the surface profile of spatially varying features during x-y scanning. Consequently, it is beneficial to have z-axis travel on the scanner as well.

The abovementioned leads to the consideration of either a moving probe/stationary sample configuration or a mixed configuration with the two fast axes (x and z) on the scanner and the slow axis (y) on the sample stage. This separation of the fast axes from the slow axis has the potential of being much more accurate than a configuration in which all three axes are on the scanner.

Figure 1:
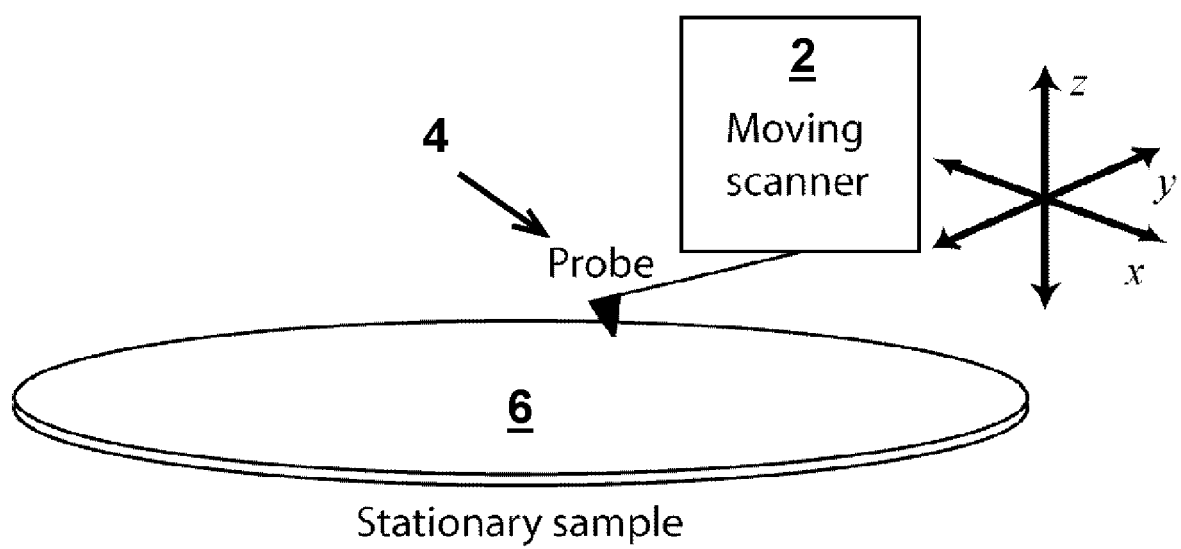
FIG. 1 is a schematic diagram illustrating a scanner that has three degrees of freedom, having a probe, and a sample stage that is stationary.
Figure 2:
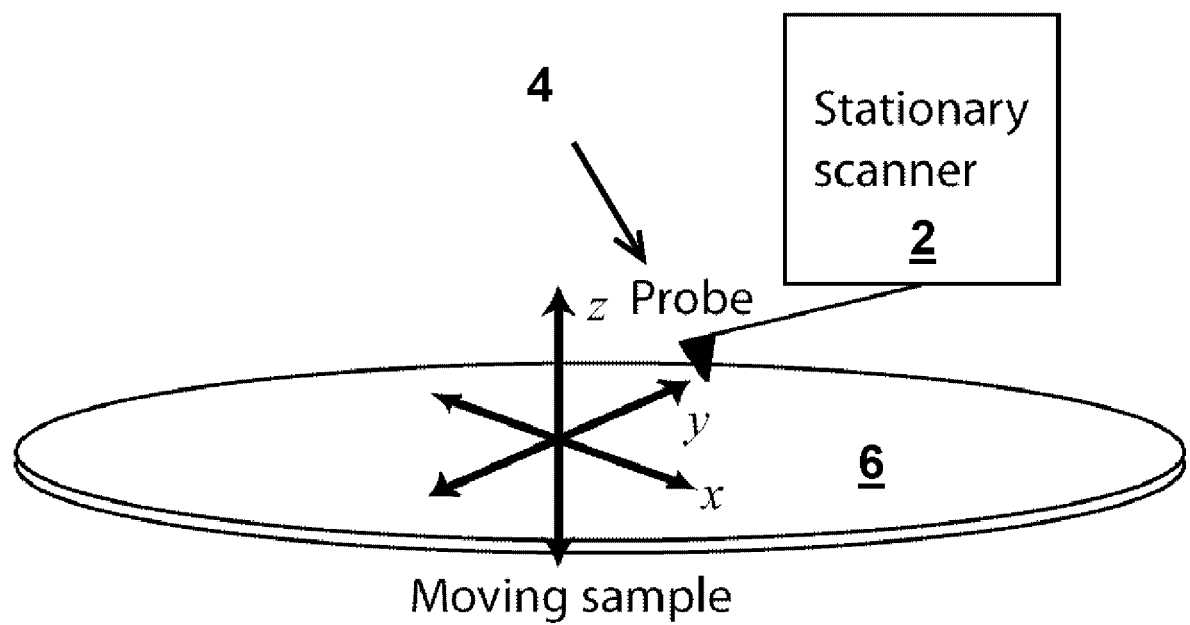
FIG. 2 is a schematic diagram illustrating a sample stage capable of providing travel in all three axes while the scanner, with probe, is stationary.
Figure 3:
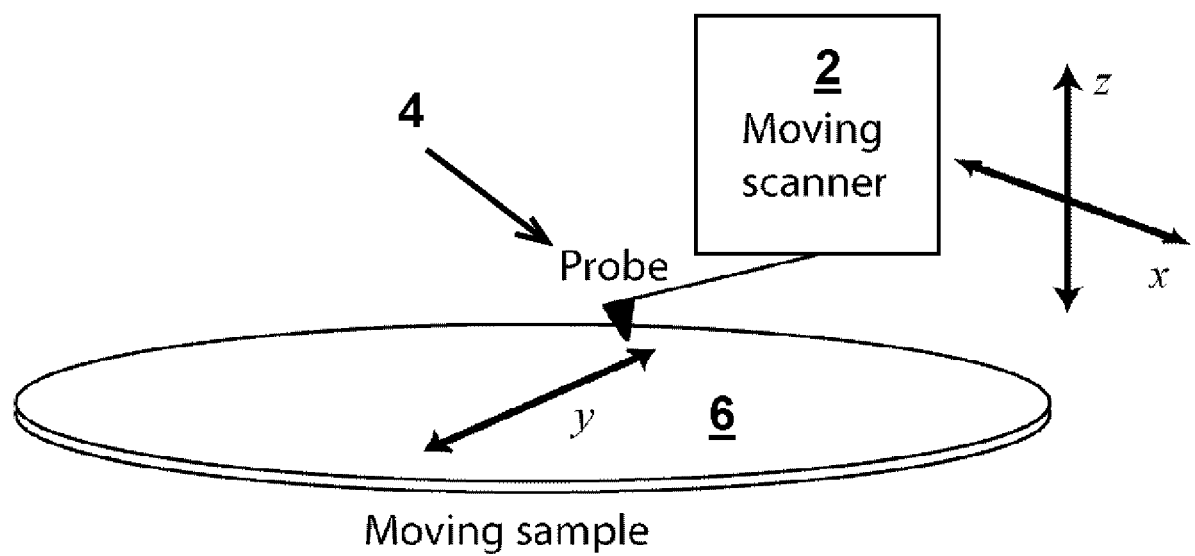
FIG. 3 is a schematic diagram illustrating a mixed configuration providing travel capabilities in one or more axes on both the scanner, with probe, and a sample stage.
Figure 4:
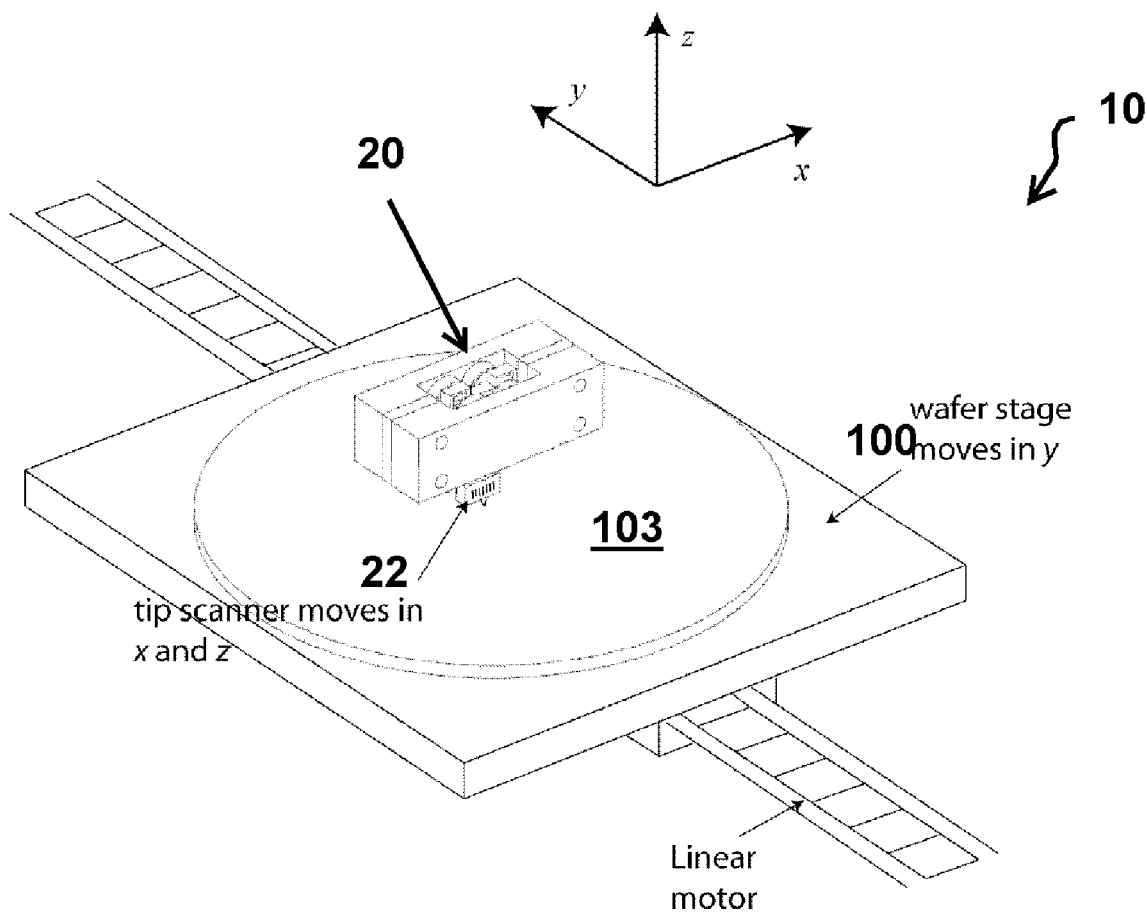
FIG. 4 is a schematic diagram illustrating a scanner system, in accordance with the present invention.

FIG. 4 is a schematic diagram illustrating a scanner system 10, in accordance with the present invention. As illustrated by FIG. 4, the scanner system 10 contains a scanner 20 and a stage 100, wherein a sample 103 (not shown) to be scanned may be located on a top surface of the stage 100. The scanner 20 provides the fast axis scan (x-axis) and the vertical height following function (z-axis). Specifically, as is explained in further detail herein, a probe tip 22 of the scanner 20 is capable of being moved in the x-axis and the z-axis. The stage 100 provides the slow axis scan (y-axis). It should be noted that in use, the stage 100 may also provide long range motion in the x-axis as well so that different areas on the sample can be scanned.

Figure 5:
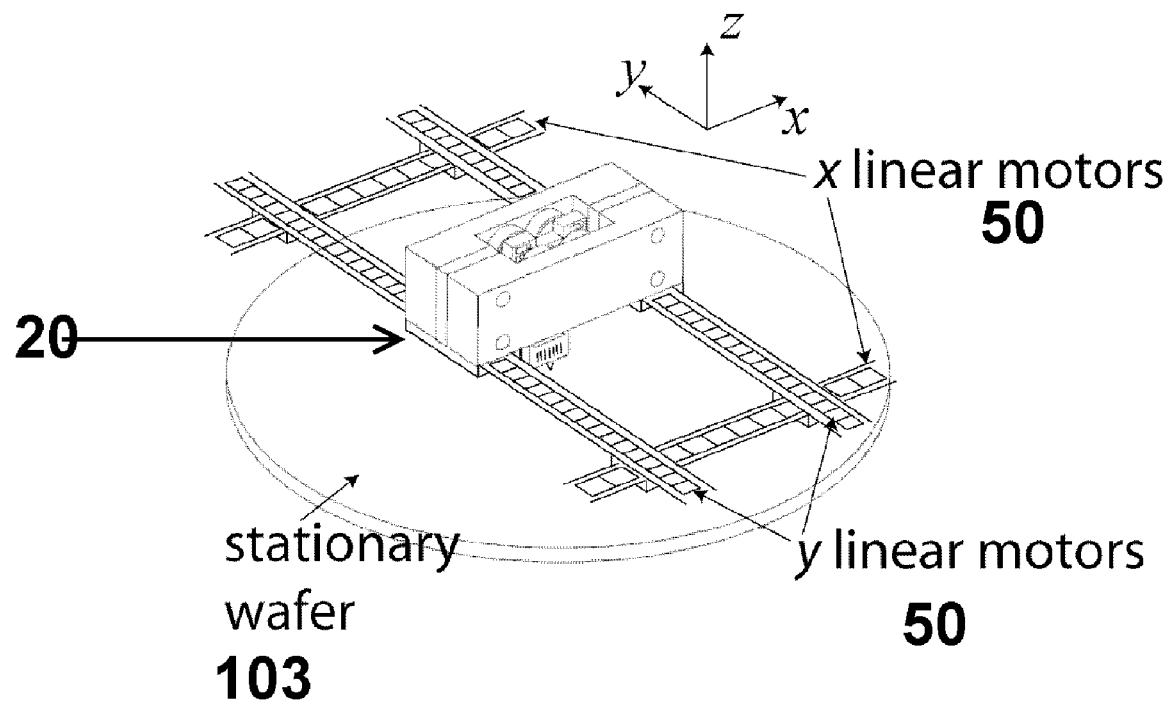
FIG. 5 is a schematic diagram illustrating the scanner system, in accordance with an alternative embodiment of the invention, where the stage is stationary.

FIG. 5 is a schematic diagram illustrating the scanner system 10, in accordance with an alternative embodiment of the invention, where the sample 103 and stage (not shown) are stationary. In the system of FIG. 5, the scanner 20 provides for fast axis scan in the x-axis and the vertical height following function in the z-axis. In addition, long-range linear motors 50 carry the scanner 20 in the x-axis and the y-axis to different locations along the stationary stage 100. As a result, in accordance with the embodiment of FIG. 5, all three degrees of freedom are provided on the probe tip 22 of the scanner 20, where none of the degrees of freedom are provided by the stage 100.

It should be noted that many different types of motors may be used for the long-range linear motion of the scanner 20. Since one having ordinary skill in the art would know of other motors that may be used for long-range movement of the scanner 20, such other motors are not further described herein. In addition, other actuation methods may be used for the long-range linear motion of the scanner 20.

Figure 6:
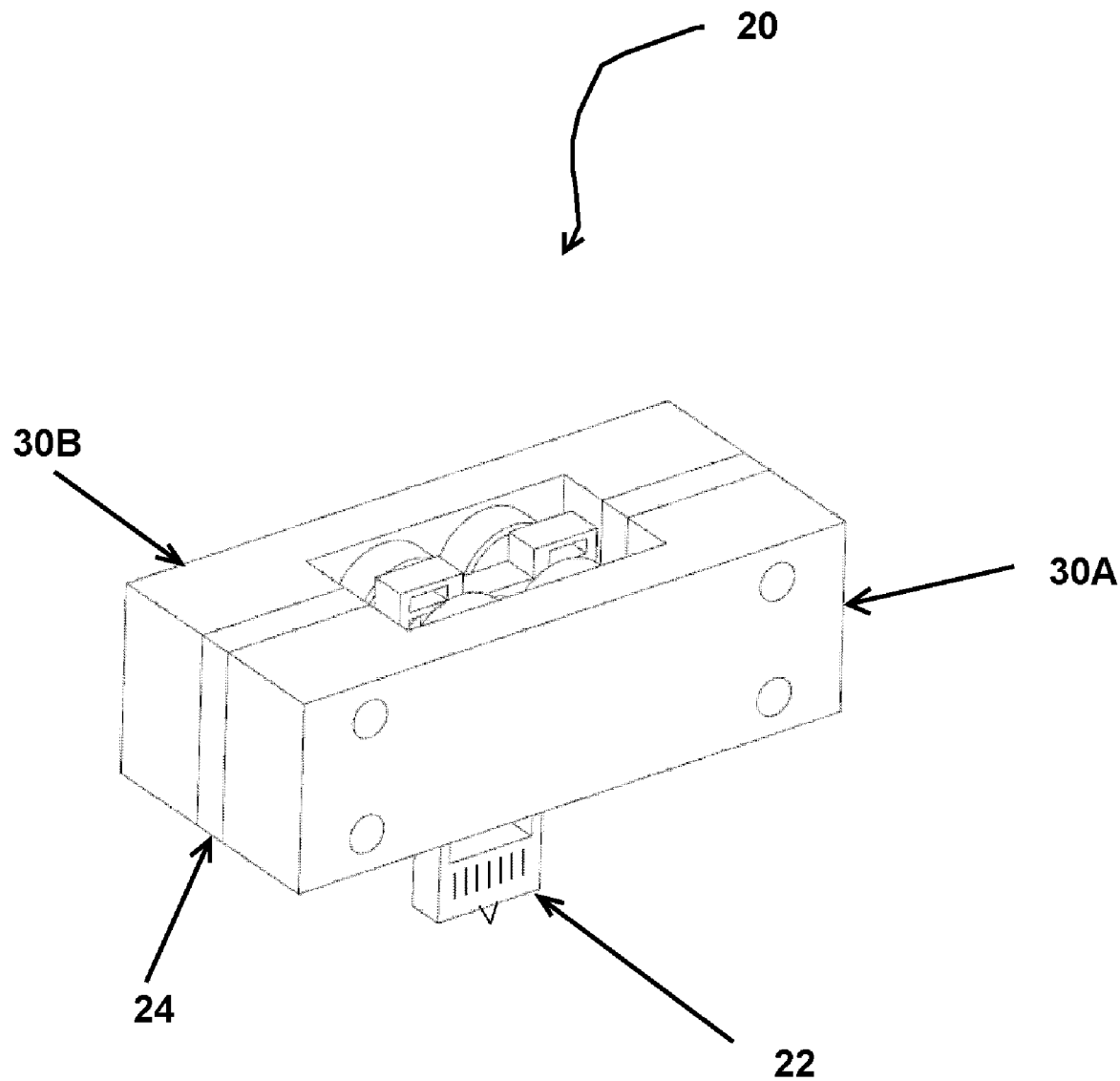
FIG. 6 is a schematic diagram further illustrating the scanner of FIG. 4.

FIG. 6 is a schematic diagram further illustrating the scanner 20 of FIG. 4. As shown by FIG. 6, the scanner 20 contains a mechanical flexure suspension 24 sandwiched between first and second actuator halves 30A, 30B. While the mechanical flexure suspension 24 may be created by one or more of many different materials, in accordance with one exemplary embodiment of the invention, the suspension 24 may be made from Silicon. One advantage of using Silicon is that a Silicon based mechanical flexure suspension 24 can be constructed using microelectromechanical systems (MEMS), which can achieve very small structures. This reduces the total moving mass and thus requires less power consumption and allows for higher scanning speeds. It should be noted that the combination of the first and second actuator halves 30A, 30B, in combination with a permanent magnet (described below) is referred to herein as an electromagnetic motor 101.

The electromagnetic motor 101 provided by the present invention contains sets of coils in a fixed frame acting on a single moving permanent magnet of the mechanical flexure suspension 24. Placing the coils in the fixed frame allows for easy cooling of the coils if desired. The motor 100 provided drives forces in both the x and z axes, while using only a single permanent magnet. The direction of magnetization of the permanent magnet is in the y-axis direction, the out-of-plane axis. The actuator halves 30A, 30B used to drive the mechanical flexure suspension 24 may be, for example, shear mode actuators, meaning that the drive forces ($F_x$ and $F_z$) are orthogonal to the direction of magnetization. The following describes examples of two variations of the motor 100, namely, a motor having a stacked coil design and a motor having a pancake coil design.

Figure 7:
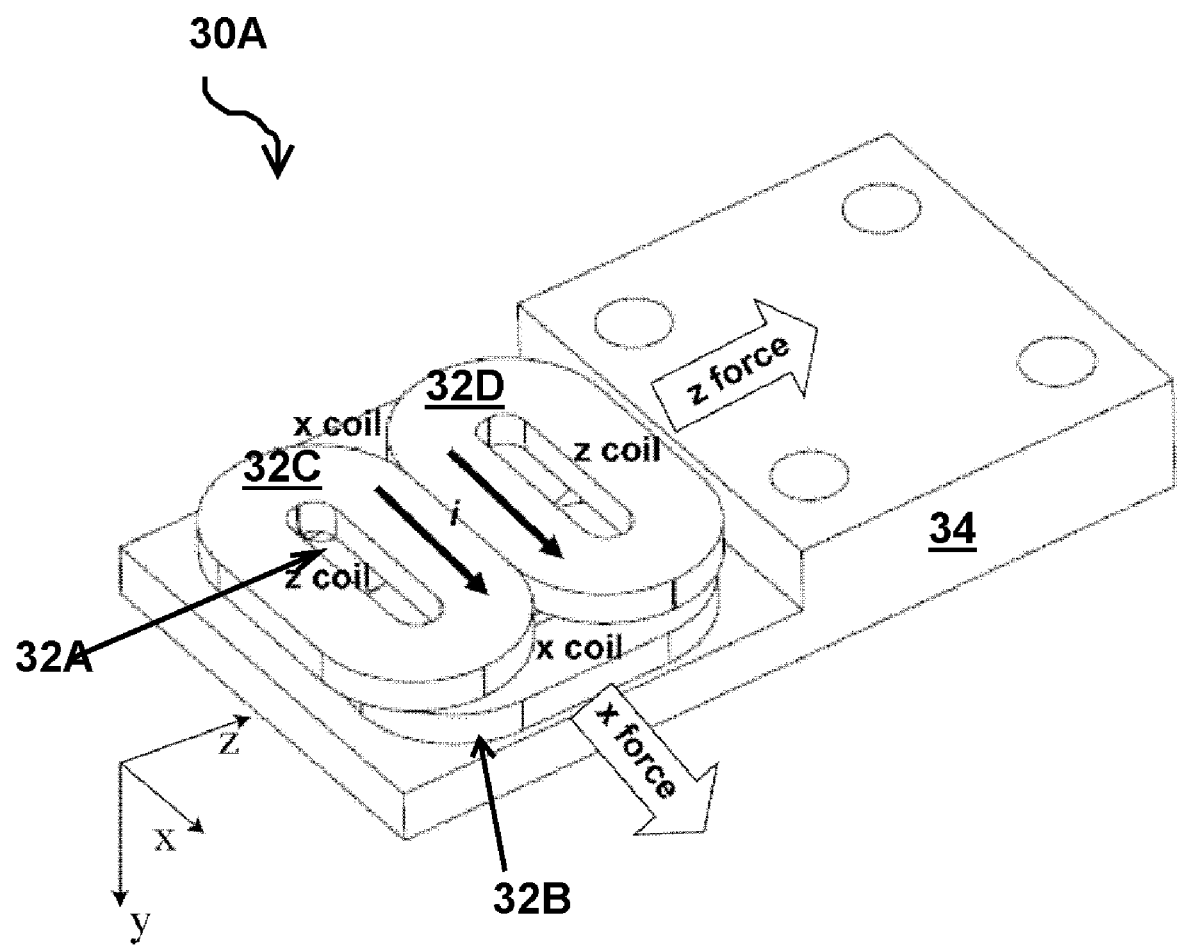
FIG. 7 is a schematic diagram further illustrating one half of the actuator of FIG. 6.

FIG. 7 is a schematic diagram further illustrating one half, 30A or 30B, of the actuator 30 of FIG. 6. It should be noted that the actuator half of FIG. 7 may be either the first actuator half 30A or the second actuator half 30B since they are the same. FIG. 7 illustrates an actuator half 30A having a stacked coil design. The stacked coil design allows for the same type of actuator coil to be used for both x and z direction actuation, and, to first-order, decouples the forces. A permanent magnet 26 (not shown), located within the mechanical flexure suspension 24, is positioned above the center of the coil configuration. Prior to describing the actuator half 30A in detail, the following further describes coil structures and force generation.

Figure 8:
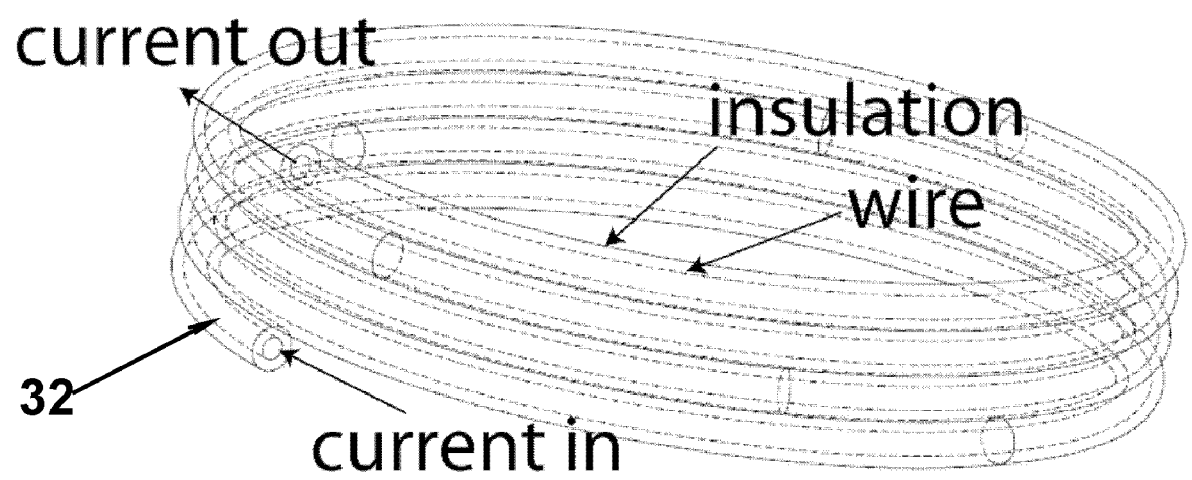
FIG. 8 is a schematic diagram further illustrating an actuator coil.

FIG. 8 is a schematic diagram further illustrating an actuator coil 32. The coil 32 contains multiple windings laid vertically on top of each other. Current flows from one end of the coil 32, through the wire, to the other end of the coil 32. Insulation surrounds the wire so that adjacent windings do not short-circuit to each other. The coil winding is very similar to how a garden hose works, namely, water flows from one end of the hose through the hose, and out the other end. The coil 32 shown in FIG. 8 is wound in a circular pattern. Other patterns can also be used, such as, but not limited to, a rectangular pattern, an oval pattern, or a racetrack pattern. To provide voltage or current to each coil 32, terminals (not shown) from each end of the coil 32 are connected to a voltage source or a current source in the form of a power amplifier.

Figure 9:
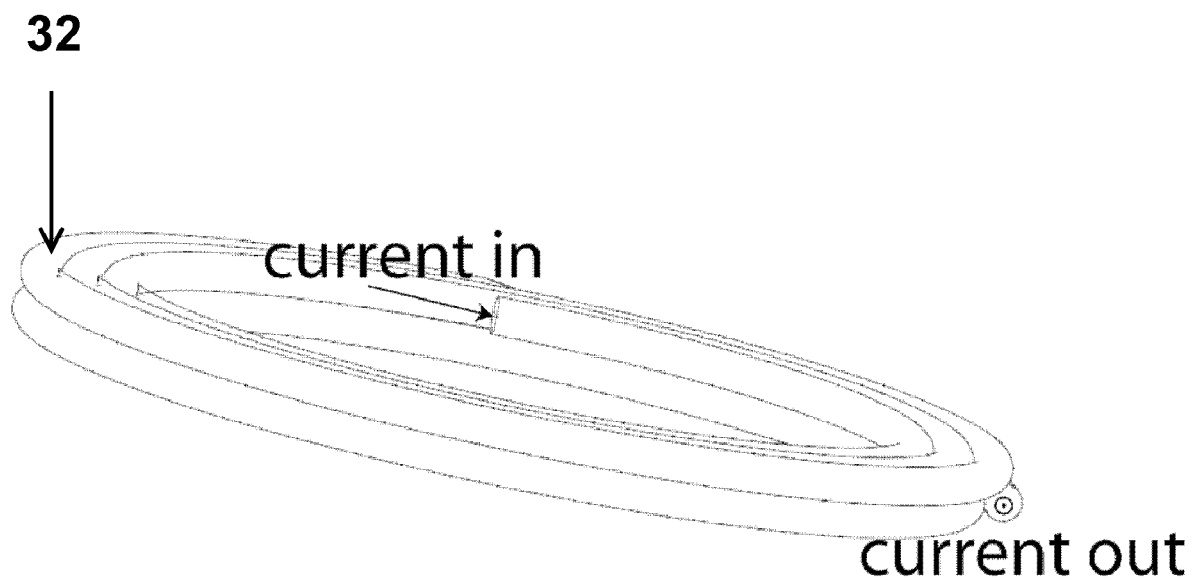
FIG. 9 is a schematic diagram illustrating a variation of how the actuator coil may be wound, in accordance with an alternative embodiment of the invention.

FIG. 9 is a schematic diagram illustrating a variation of how the actuator coil 32 may be wound, in accordance with an alternative embodiment of the invention. In addition to multiple windings stacked on top of each other in the vertical direction as shown by FIG. 8, windings may spiral outwards in the horizontal plane. It is noted that the wire is not shown in FIG. 9, but instead, only the insulation is visible.

Figure 10:
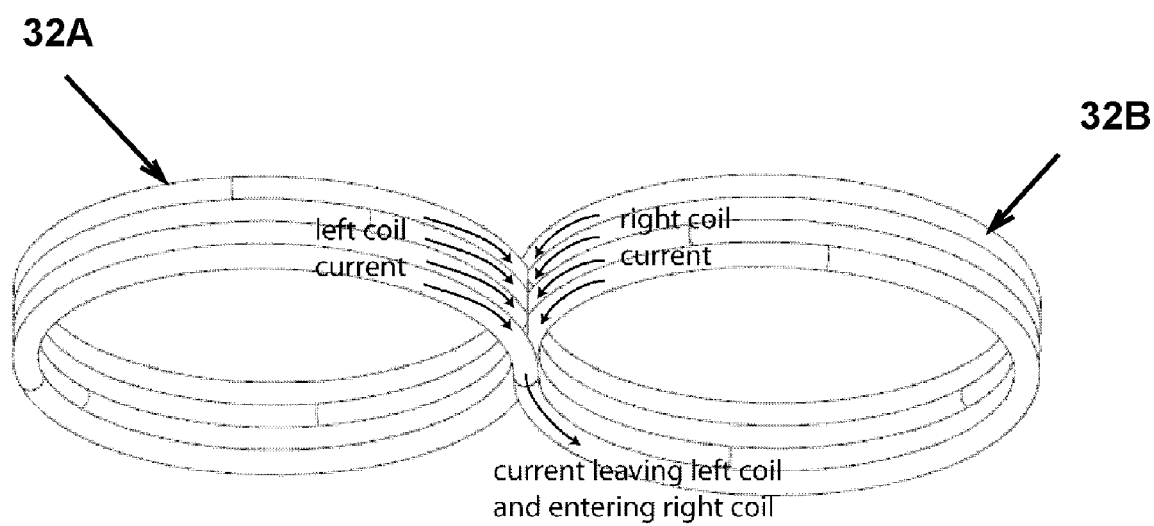
FIG. 10 is a schematic diagram illustrating how a first actuator coil and a second actuator coil can be wound in series side-by-side.

FIG. 10 is a schematic diagram illustrating how a first actuator coil 32A and a second actuator coil 32B can be wound in series side-by-side. In FIG. 10, current enters the first actuator coil 32A, travels through the first actuator coil windings, then enters the second actuator coil 32B, where it travels through the second actuator coil windings, and then exits the second actuator coil 32B. In this way, the current from the two actuator coils 32A, 32B reinforce each other at the center between the coils 32. It is noted that current in each coil 32 is traveling in the same direction at the center.

Figure 11:
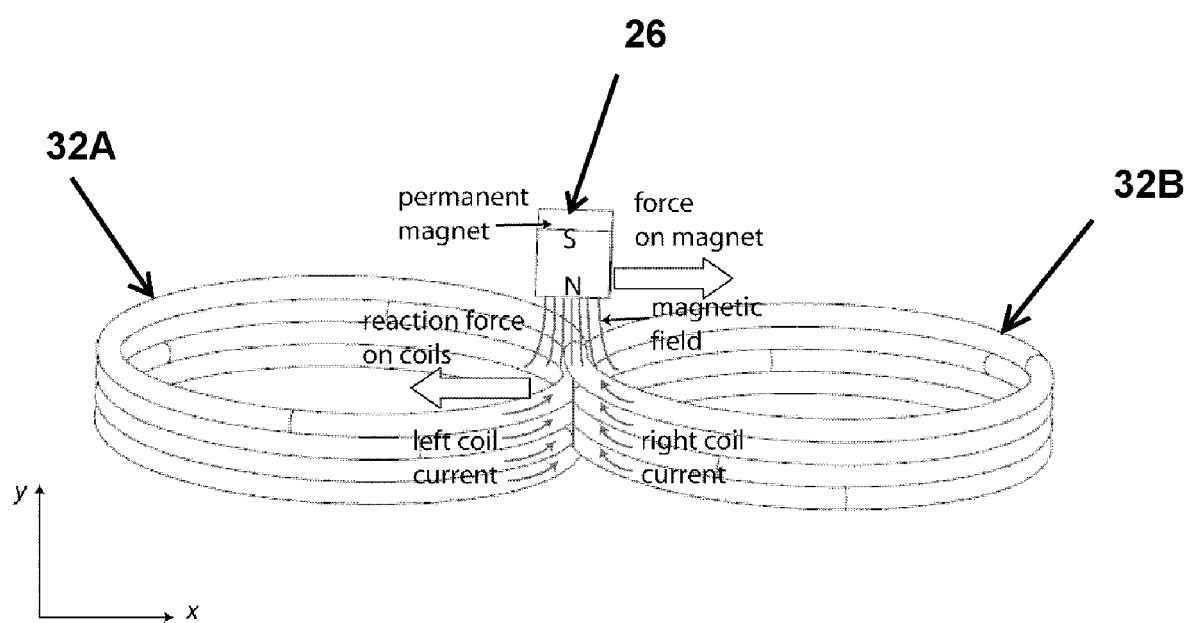
FIG. 11 is a schematic diagram illustrating the two coils of FIG. 10, where the coils are interacting with a permanent magnet.

FIG. 11 is a schematic diagram illustrating the two coils 32A, 32B of FIG. 10, where the coils 32 are interacting with a permanent magnet 26. It is noted that a permanent magnet 26 is located on the mechanical flexure suspension 24, as described in detail below. As shown by FIG. 11, coil current at the center between the coils 32A, 32B interacts with the magnetic field (B) from the permanent magnet 26 to produce a Lorentz force on the permanent magnet 26 and an equal and opposite reaction force on the coils 32A, 32B. Specifically, current from the two coils 32A, 32B reinforce each other at the center and is directed along the −z-axis. This current interacts with the −y-directed magnetic field from the permanent magnet 26 to produce a +x-directed force on the permanent magnet 26 and a −x-directed reaction force on the two coils 32A, 32B.

Figure 12:
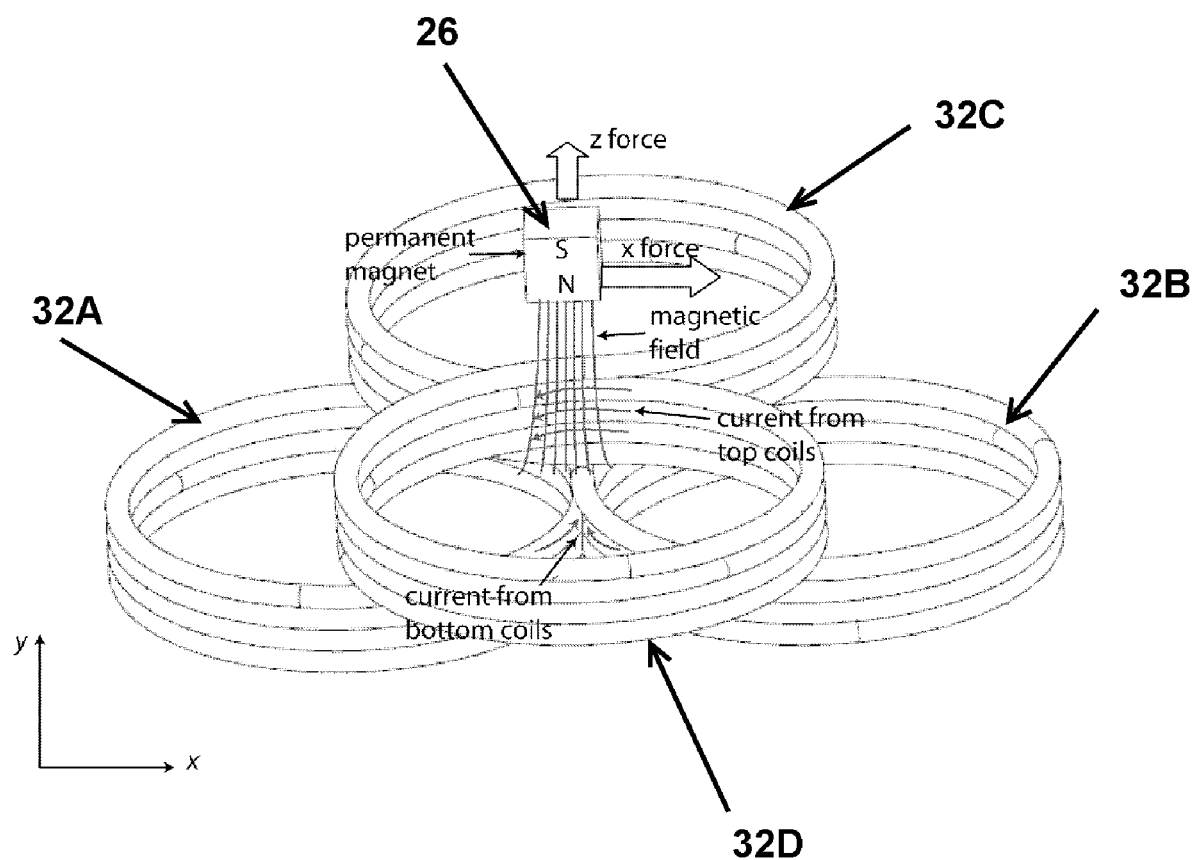
FIG. 12 is a schematic diagram illustrating the two pairs of identical coils, one on top of the other, oriented orthogonally to each other.

An identical pair of coils 32C, 32D can be placed directly on top of the pair of first two coils 32A, 32B, but oriented orthogonally to the first pair 32A, 32B. In this way, two orthogonal forces can be generated using only one permanent magnet. It is noted, however, that the present invention is not limited to the use of only one magnet. FIG. 12 is a schematic diagram illustrating the two pairs of identical coils, one on top of the other, oriented orthogonally to each other. The two pairs of identical coils may be maintained in this position by using one or more different methods, such as, but not limited to, using a non-magnetically conductive epoxy. As shown by FIG. 12, the bottom pair of coils 32A, 32B produce a force in the x-direction on the permanent magnet 26, while the top pair of coils 32C, 32D produce a force in the z-direction on the permanent magnet 26.

Figure 13:
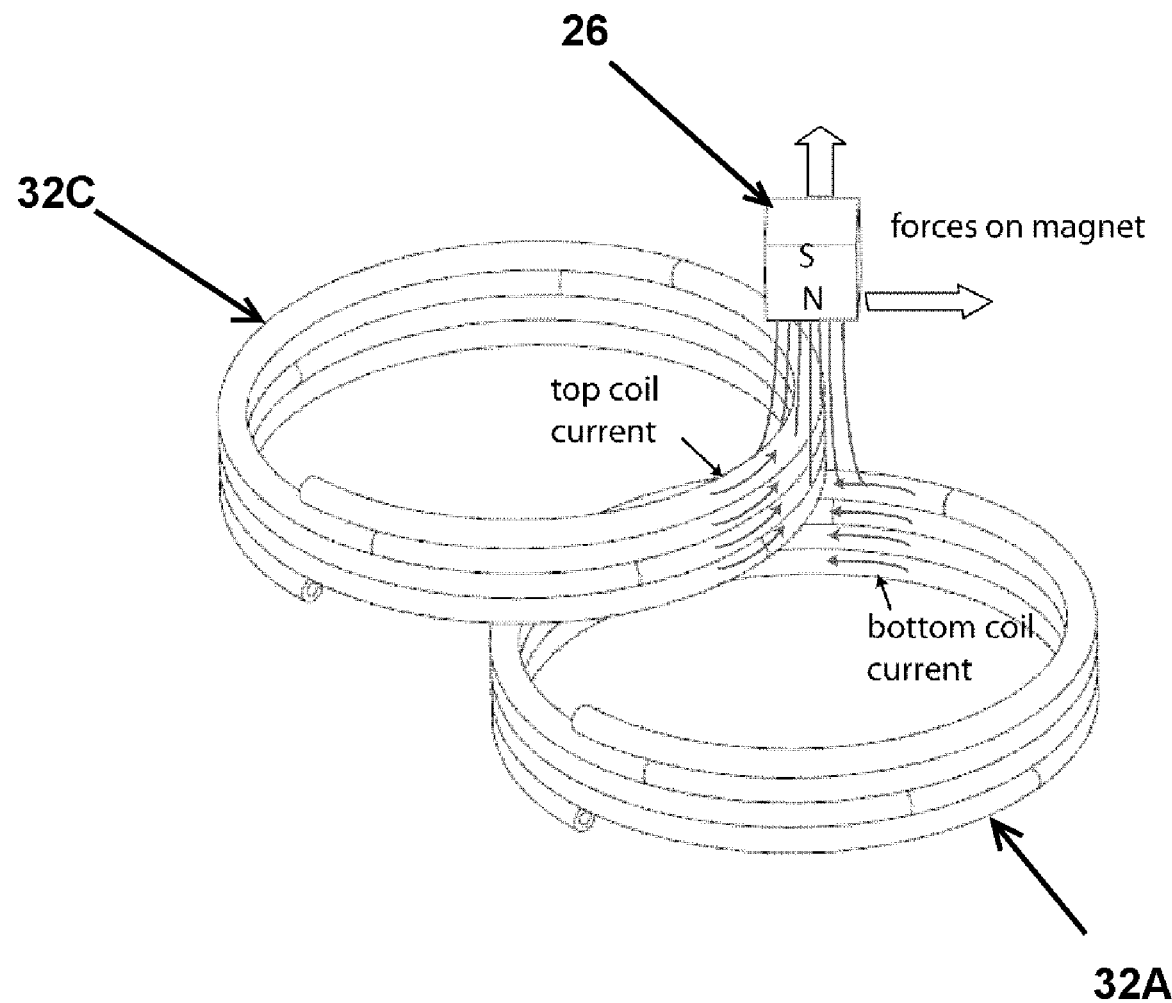
FIG. 13 is a schematic diagram illustrating a two-coil setup.

The minimum number of coils necessary to generate two orthogonal forces with only one magnet is two coils: one for the x-force generation, and one coil oriented orthogonally to the first coil for z-axis force generation. For exemplary purposes, a two-coil setup is illustrated by FIG. 13. The asymmetry of the coil assembly of FIG. 13 is one disadvantage of using only two coils 32A, 32C. Using four coils instead of two coils allows the setup of the actuator half 30A to be symmetrical about the yz plane. If an identical set of four coils is added to the first actuator half 30A, and the identical set is placed above the permanent magnet 26, as is characteristic of the present electromagnetic motor 101, then the setup is symmetric about the xz plane as well. This permits the forces on the permanent magnet 26 to be balanced about the center of mass of the permanent magnet 26 and mitigates unwanted torques.

Figure 14:
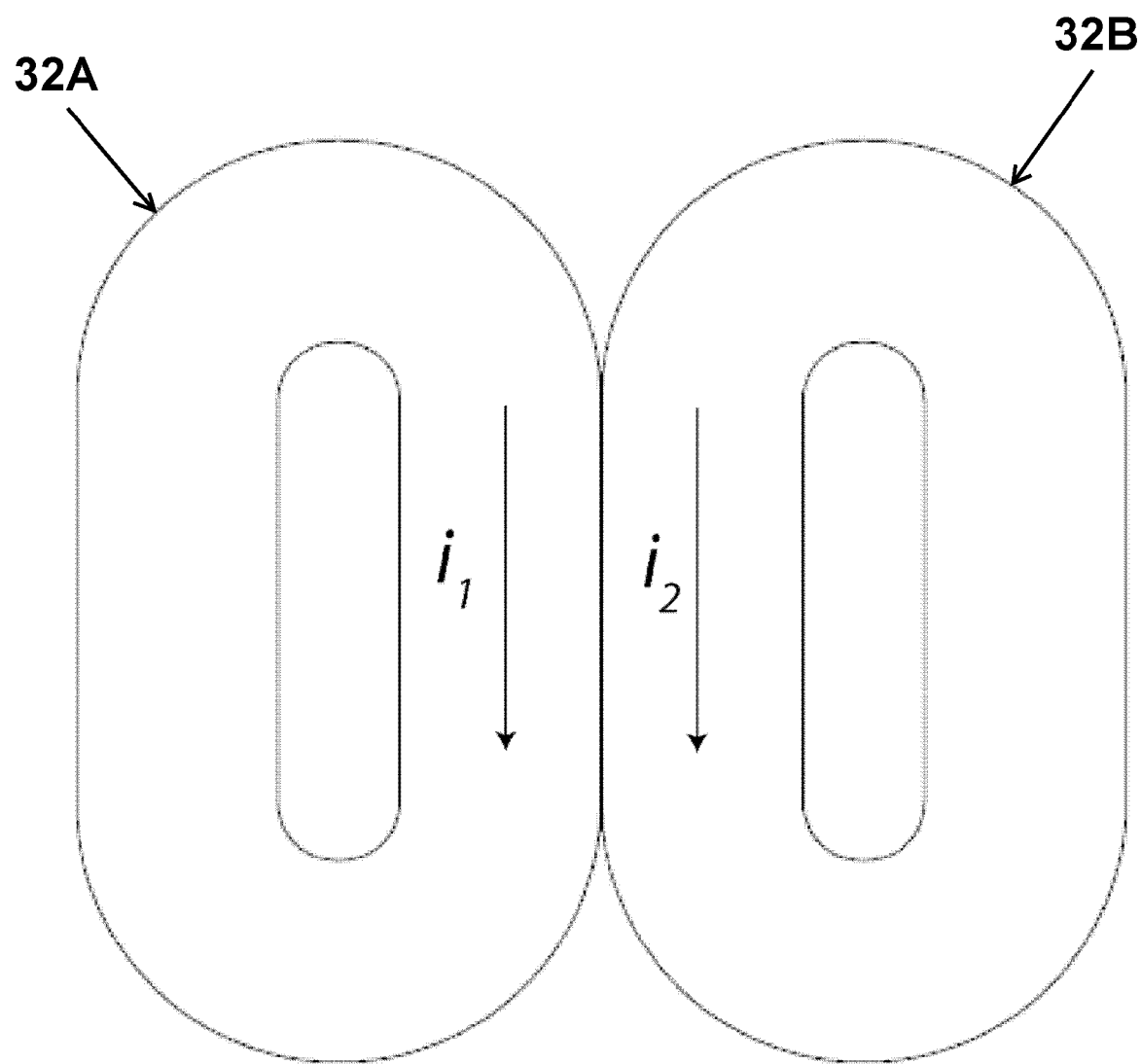
FIG. 14 is a schematic diagram illustrating current flow in a pair of coils.

Returning to FIG. 7, the first actuator half 30A contains a first pair of actuator coils 32A, 32B, and a second pair of actuator coils 32C, 32D, wherein the second pair of actuator coils 32C, 32D are located above the first pair of actuator coils 32A, 32B. For a given pair of coils, current flows in the direction shown in FIG. 14, or in the reverse direction. Thus, the currents from the two sets of coils reinforce each other in the center in order to generate a force on the permanent magnet.

Returning to FIG. 7, the bottom pair of coils generates a Lorentz force in the x-direction. Current flows in the z direction where the two coils meet in the center, and interacts with the y-directed magnetic field from the permanent magnet 26 to produce a force in the x direction. Similarly, the top pair of coils 32C, 32D is oriented such that force is generated in the z direction. Current flows in the x direction where the two coils 32C, 32D meet in the center, and interacts with the y directed magnetic field to produce a z direction force.

In the scanner 20, a complementary actuator assembly, referred to herein as the second actuator half 30B, is located on an opposite side of the permanent magnet 26 positioned in the mechanical flexure suspension 24, wherein, as shown by FIG. 6, the mechanical flexure suspension 24 is sandwiched between the first and second actuator halves 30A, 30B.

The second actuator half 30B, located on the opposite side of the permanent magnet 26 from the first actuator half 30A, completes the magnetic circuit through a metallic backing 34, balances forces about a center of mass of the permanent magnet 26, and generates higher total forces. The metallic backing 34, which may be made of one or more metals, such as, but not limited to, steel, allows the coils to couple more efficiently to the permanent magnet 26 and helps to keep the shear forces, $F_x$ and $F_z$, while mitigating normal forces, $F_y$. The metallic backing 34 is made of a material that has relatively high magnetic permeability. The bottom pair of actuator coils are connected to the metallic backing 34 using one or more of many different methods, such as, but not limited to, using a nonmagnetically conductive epoxy. The top pair of actuator coils are then arranged and maintained on top of the bottom pair of actuator coils in a similar manner, such as, but not limited to, by use of a nonmagnetically conductive epoxy. The metallic backing 34 directs magnetic field lines, as illustrated by FIG. 15, which is described in detail below.

It should also be noted that shape of the metallic backing 34 is provided so as to maintain the actuator coils in place and allow for the actuator halves to be positioned opposite each other, with the mechanical flexure suspension 24 located therebetween.

Figure 15:
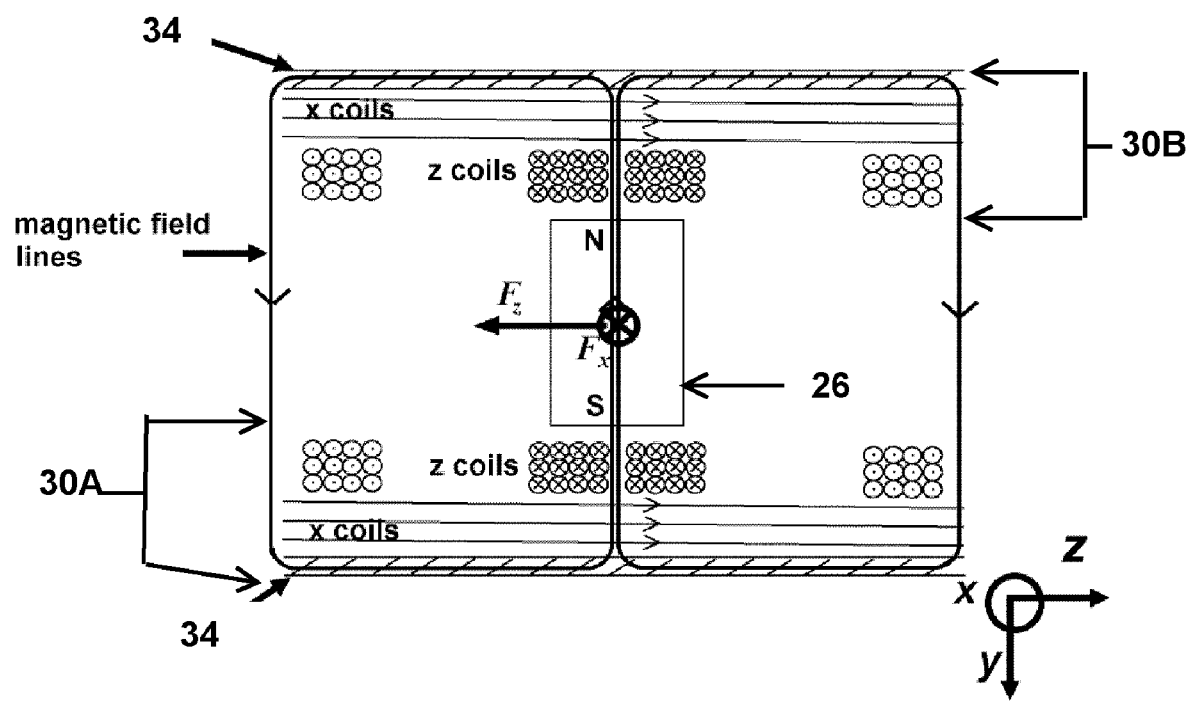
FIG. 15 is a schematic diagram illustrating a cross-section of the electromagnetic motor having the two actuator halves with the permanent magnet of the mechanical flexure suspension located therebetween.

For a better understanding of forces within the scanner, FIG. 15 is a schematic diagram illustrating a cross-section of the electromagnetic motor 101 having the two actuator halves 30A, 30B with the permanent magnet 26 of the mechanical flexure suspension 24 (not shown) located therebetween. FIG. 15 illustrates how current interacts with the magnetic field (B-field) of the permanent magnet 26 to provide drive forces on the permanent magnet 26.

As shown by FIG. 15, the current interacts with the B-field generated by the permanent magnet 26 to produce Lorentz forces, $F_x$ and $F_z$, on the permanent magnet 26 that are orthogonal to both the current direction and the magnetic field direction. Specifically, referring to the first actuator half 30A, for the bottom pair of coils (illustrated as x coils), a Lorentz force is generated in the x direction. For the x coils, current flows in the z direction, where the two coils meet in the center, and interacts with the y directed magnetic field (B-field) from the permanent magnet 26 to produce a force in the x direction. Similarly, the top pair of coils (illustrated as z coils) in the first actuator half 30A is oriented such that force is generated in the z direction. Current for the z coils flows in the x direction where the two coils meet in the center, and interacts with the y directed B-field to produce a z direction force.

A complementary actuator assembly, namely, the second actuator half 30B, is located on the opposite side of the permanent magnet 26 and completes the magnetic circuit through the metallic backing 34, balances the forces about the center of mass of the permanent magnet 26, and generates higher total forces. The metallic backing 34 allows the actuator coils to couple more efficiently to the magnet and helps to keep shear forces, $F_x$ and $F_z$, while mitigating normal forces, $F_y$.

Figure 16:
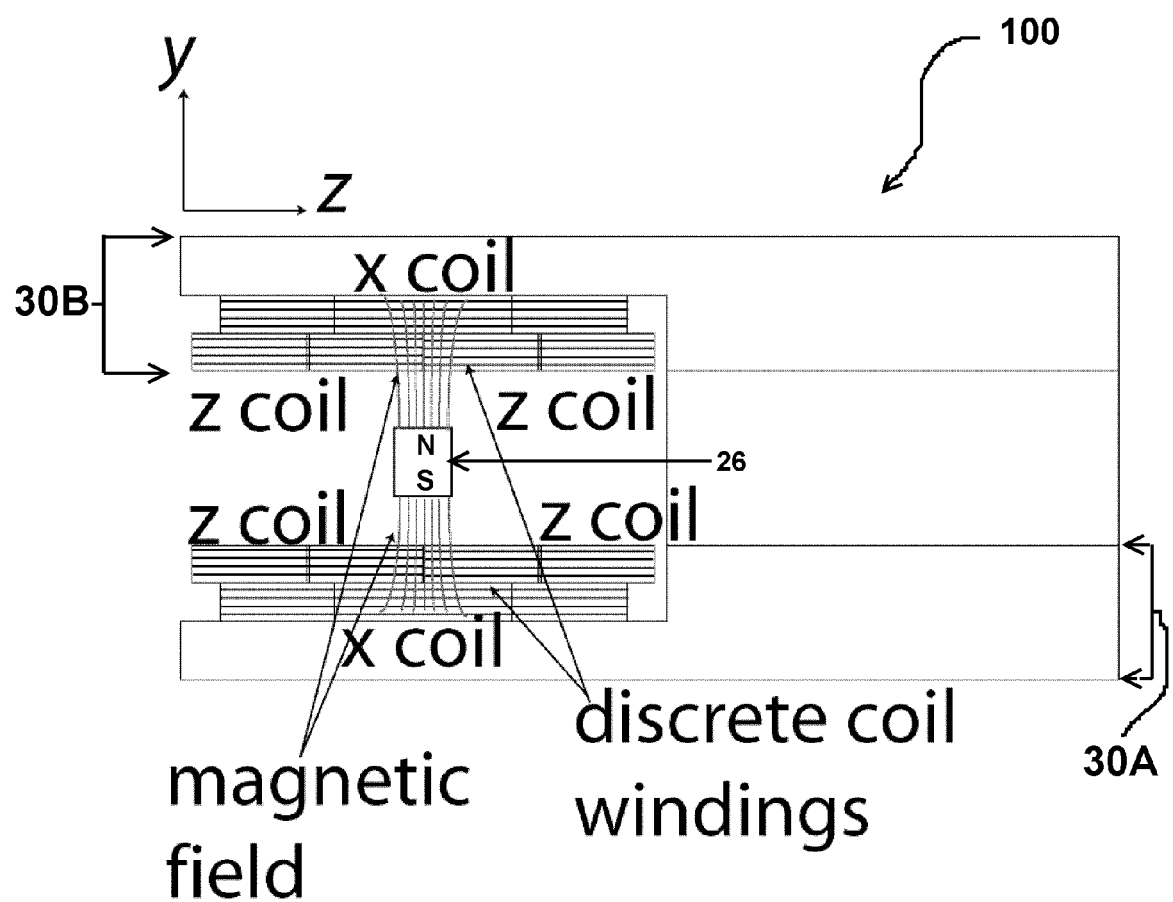
FIG. 16 is a schematic diagram illustrating a side view of the electromagnetic motor having the two actuator halves with the permanent magnet of the mechanical flexure suspension located therebetween.

FIG. 16 is a schematic diagram illustrating a side view of the electromagnetic motor 101 having the two actuator halves 30A, 30B with the permanent magnet 26 of the mechanical flexure suspension 24 located therebetween. It should be noted that, while the permanent magnet 26 is shown by FIG. 16, for simplicity of illustration, the rest of the mechanical flexure suspension 24 is not shown. The individual windings shown by FIG. 16 are shown for the different sets of actuator coils 32A, 32B, 32C, 32D. It is to be noted that the wires in each winding are separated from each other by layers of insulation so that adjacent wires do not short circuit to each other.

The coils for both axes of FIG. 16 are identical in design. Larger force is required to drive the z-axis since it is driven in a random access mode rather than a resonant mode. As a result, the z-axis actuator coils are located closer to the permanent magnet 26 in order to reduce the effect of magnetic field fringing. Random access means that the position that the probe tip must move in the z-direction is "random"—that is, it is not known ahead of time where the probe tip needs to be, but is determined real-time as the scanner is operating. This can result in large forces being necessary to position the tip very quickly in the z-axis to the desired location. Contrariwise, the desired motion of the x-axis is a well-defined repeating pattern that is known apriori. Because of the repeating nature of the motion, this means that that the x-direction motion can be driven at the resonant frequency of the flexure. As is known in the art, if the resonant frequency is lightly damped (and flexures have very low damping), relatively very little force is needed to drive the system at its resonance frequency.

Figure 17:
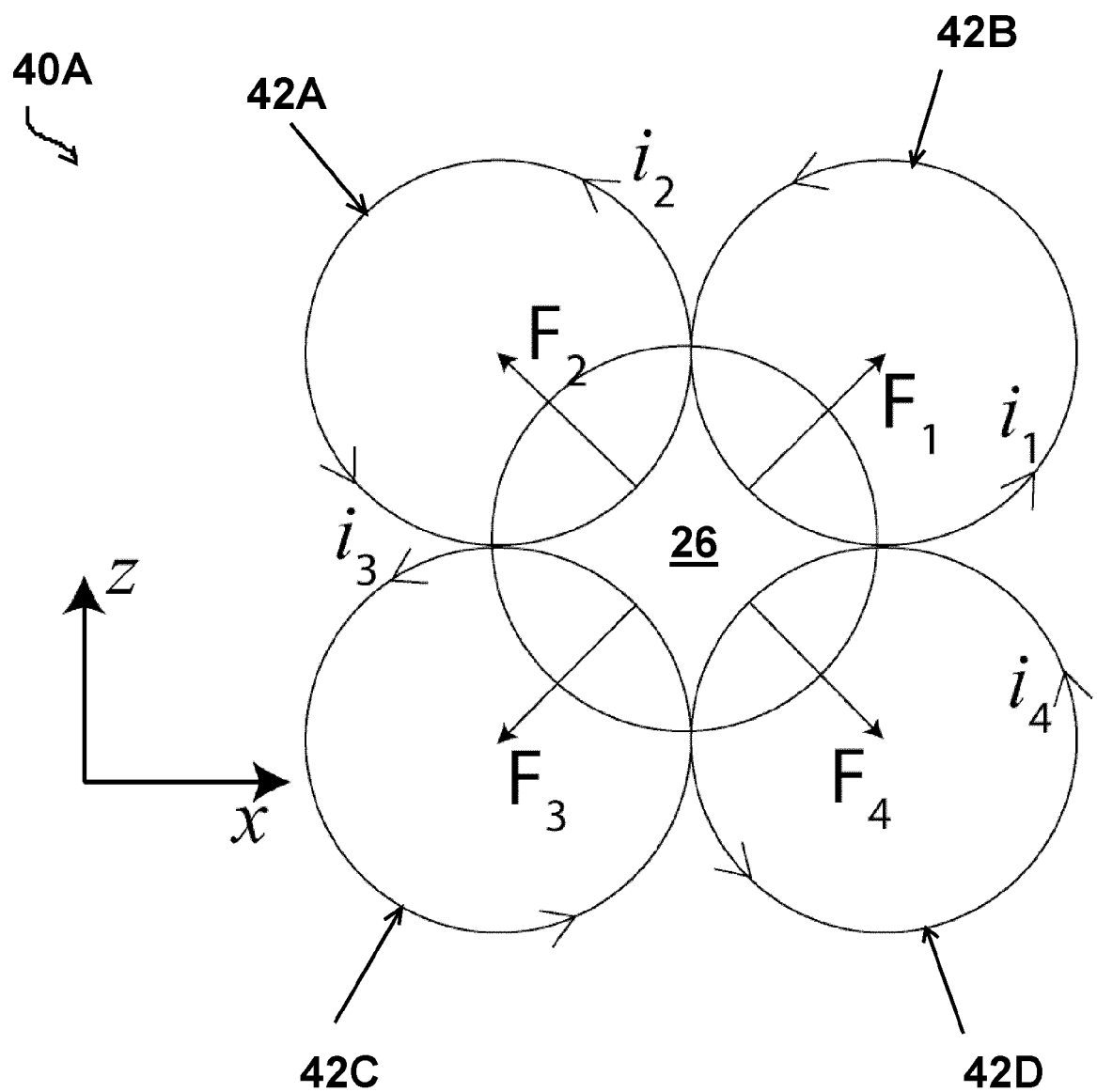
FIG. 17 is a top view schematic diagram illustrating a pancake coil design for a first actuator half positioned over a permanent magnet.

Having described a first variation of the electromagnetic motor 101, namely, a motor having a stacked coil design, the following describes a second variation of the electromagnetic motor 101, namely, a motor having a pancake coil design. FIG. 17 is a top view schematic diagram illustrating a pancake coil design for a first actuator half 40A positioned over a permanent magnet 26. The pancake coil design contains four actuator coils 42A, 42B, 42C, 42D that are all positioned in the same plane and located above the permanent magnet 26. It is noted that the magnetic field of the permanent magnet 26 comes out of the page and forces for each of the actuator coils are illustrated by FIG. 17.

Figure 18:
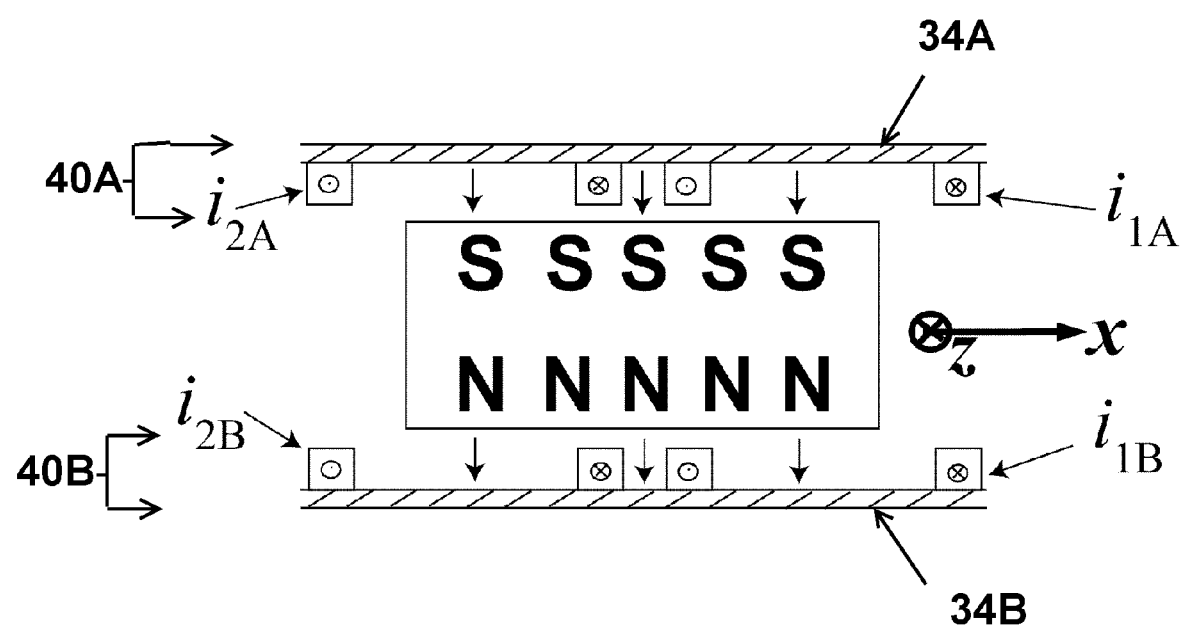
FIG. 18 is a side view cross sectional schematic diagram illustrating a pancake coil design showing the first actuator half of FIG. 17, a permanent magnet, and a second actuator half.

FIG. 18 is a side view cross sectional schematic diagram illustrating a pancake coil design showing the first actuator half 40A of FIG. 17, a permanent magnet 26, and a second actuator half 40B. As shown by FIG. 18, another set of four actuator coils are positioned below the permanent magnet 26. As with the stacked coil design, a first metallic backing 34A and a second metallic backing 34B connect the first actuator half 40A with the second actuator half 40B and complete the magnetic circuit. In contrast to the stacked coil design, each actuator coil provides drive forces in both the x and z directions. In addition, the Lorentz forces are produced in a similar manner to those produced in the stacked coil design. The coil currents interact with the magnetic field of the permanent magnet 26 to produce Lorentz forces, $F_x$ and $F_z$, on the permanent magnet 26 that are orthogonal to both the current direction and the magnetic field direction.

One advantage of the pancake coil design over the stacked coil design is that since the coils are all located in one plane, the effective air gap between the permanent magnet and the metallic backing can be made smaller. This produces a higher magnetic field (B-field), which will produce higher force densities. However, there are several disadvantages to this design. First, since each actuator coil produces a force that is in both the x and z direction, it will be necessary that force components from some coils will cancel with force components of other coils in order to produce the desired aggregate force. This leads to inefficient use of power. Second, motor commutation is more difficult in the stacked coil design since the forces in the x and z directions are highly coupled. Finally, the actuator coils do not overlap the center of the permanent magnet 26. This is due to circular shape of the actuator coils. Therefore, none of the magnetic flux passing through this center portion will produce any force. It should be noted that this problem may be remedied by using square coils. However, a minimum radius of curvature for the actuator coils will still leave some space in the center where there is no actuator coil overlap.

While the stacked actuator coil design and the pancake actuator coil design have certain differences, it should be noted that both electromagnetic actuator designs: are utilized to provide a motor that provides two-axis forces, while using only a single permanent magnet; provide actuator coils in a fixed frame allowing for easy cooling of the coils; and, the metallic backing used couples the actuator coils more efficiently to the permanent magnet in order to keep the shear forces (the desired forces in the x and z directions), while avoiding normal forces (y direction).

Having described examples of actuator halves and interaction with permanent magnets, the following provides examples of the mechanical flexure suspension 24 of FIG. 6. It should be noted that the mechanical flexure suspension 24 is not intended to be limited by the following examples.

Figure 19:
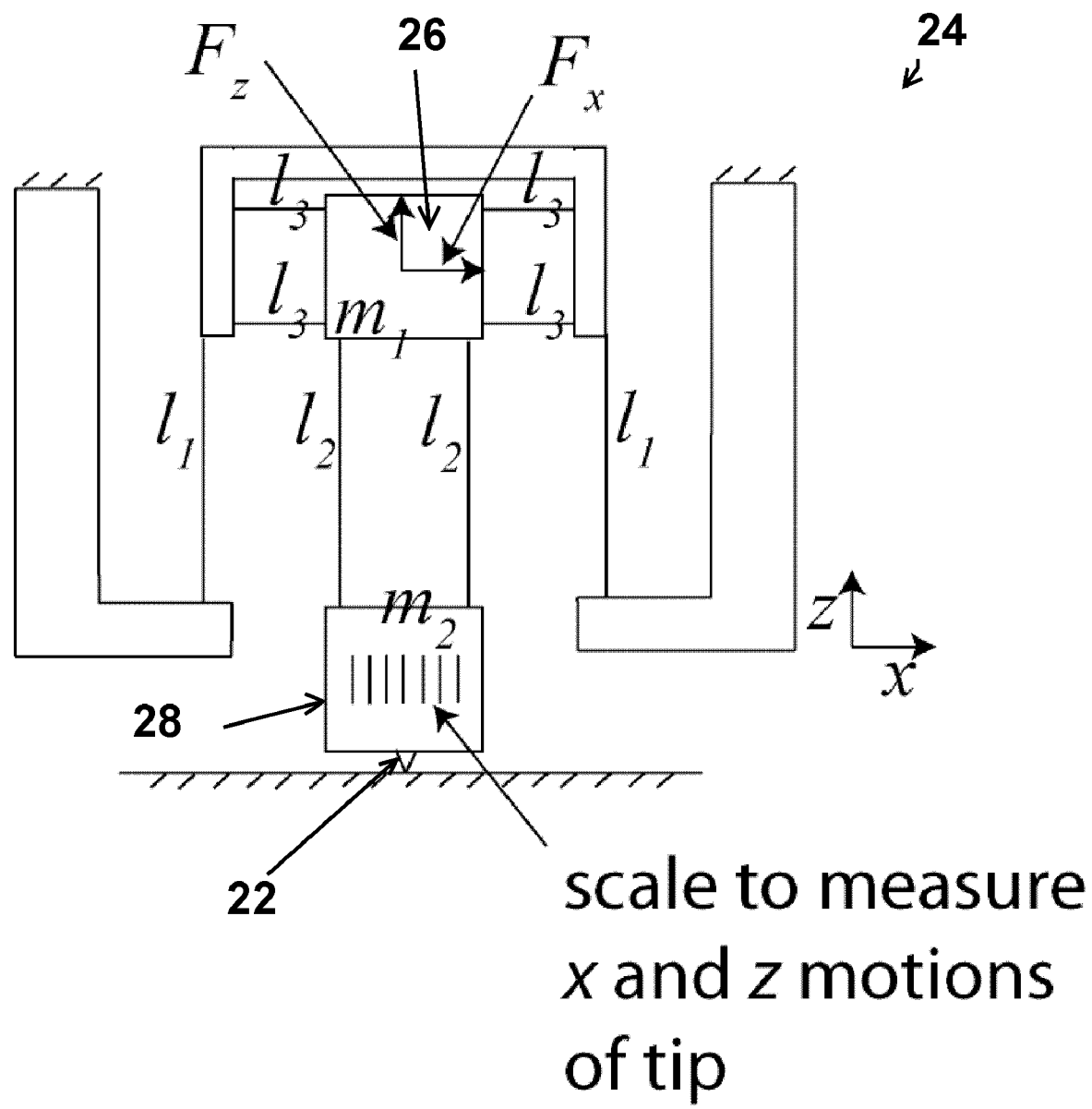
FIG. 19 is a schematic diagram illustrating the basic concept of the mechanical flexure suspension for the two degrees of freedom (DOF) scanner.

FIG. 19 is a schematic diagram illustrating the basic concept of the mechanical flexure suspension 24 for the two degrees of freedom (DOF) scanner 20. As shown by FIG. 19, the suspension 24 contains a first mass labeled m1, which includes the permanent magnet 26, and a second mass 28 labeled m2. The second mass 28 has the probe tip 22 extending therefrom. The most important characteristic of the second mass m2 is that it must be appropriately sized so that the mode shape of the x-axis scanning will be in the required $[1\ 2]^T$ shape (to be described below). Additionally, the second mass m2 must have space for position sensing elements.

When the scanner 20 is in use, drive forces, $F_x$ and $F_z$, are applied at the first mass 26. This leaves the second mass 28 available for metrology. Since the second mass m2 is closer to the actual scanning probe tip 22, focusing metrology here permits much more accurate metrology. If the actuation were applied at the second mass 28, instead of the first mass 26, locating the metrology near the probe tip 22 would be much more difficult. Specifically, packaging both the actuator and the sensor at the same location (second mass 28) becomes very difficult due to space constraints. It would be difficult to keep the actuation out of the way of the preferred sensor location and they will likely interfere with each other, especially given the small size of the structure. In addition, flexures labeled $l_1$ and $l_2$ allow scanning in the x-axis in a resonant mode. If flexures $l_1$ and $l_2$ are made to be of equal length, the flexures can be designed such that there is no parasitic z motion of the probe tip 22 during scanning. Moreover, scanning at the resonant frequency of the scanner 20 permits very low actuator power consumption. Further, the flexures labeled $l_3$ allow z-axis travel in a non-resonant, sample-height following mode. Travel in the z-axis will not introduce parasitic motion on the second mass 28 in the x direction. This is because $F_z$ is directed along an axis that intersects the center of mass of the second mass 28.

Figure 20:
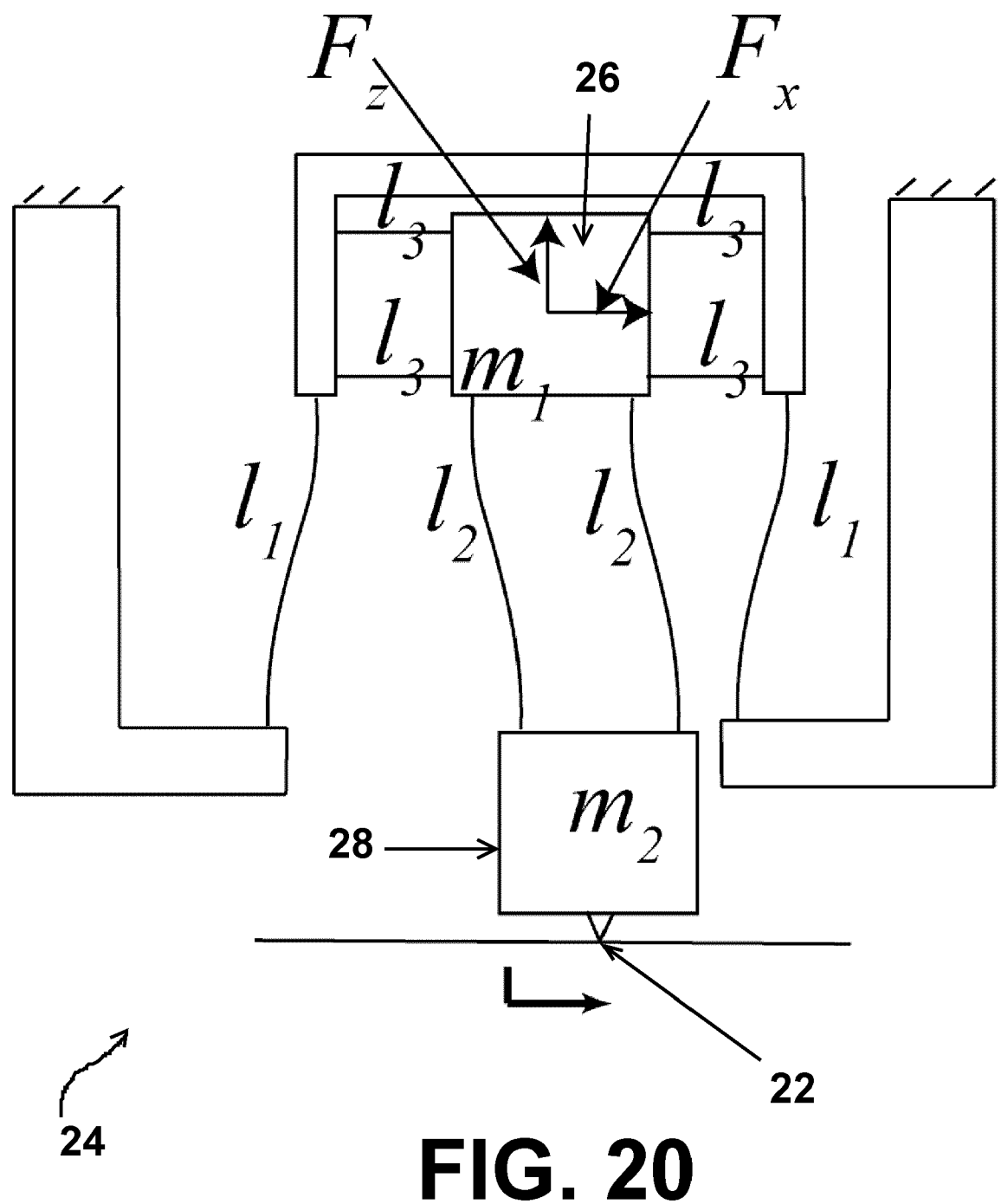
FIG. 20 is a schematic diagram illustrating the mechanical flexure suspension of FIG. 19 with an exaggerated view of flexures during x-axis scanning.

FIG. 20 is a schematic diagram illustrating the mechanical flexure suspension 24 of FIG. 19 with an exaggerated view of flexures during x-axis scanning. As flexures $l_1$ and $l_2$ deflect in the +x direction, the outer flexures $l_1$ tend to move the first mass 26 in the −z direction, while the inner flexures $l_2$ tend to move the second mass 28 in the +z axis relative to the first mass 26. With the mode shape of the flexure configuration designed correctly, these motions in the +z and −z directions will cancel each other such that the second mass 28, and hence the probe tip 22, will experience no parasitic motion in the absolute z axis during x axis scanning.

Figure 21:
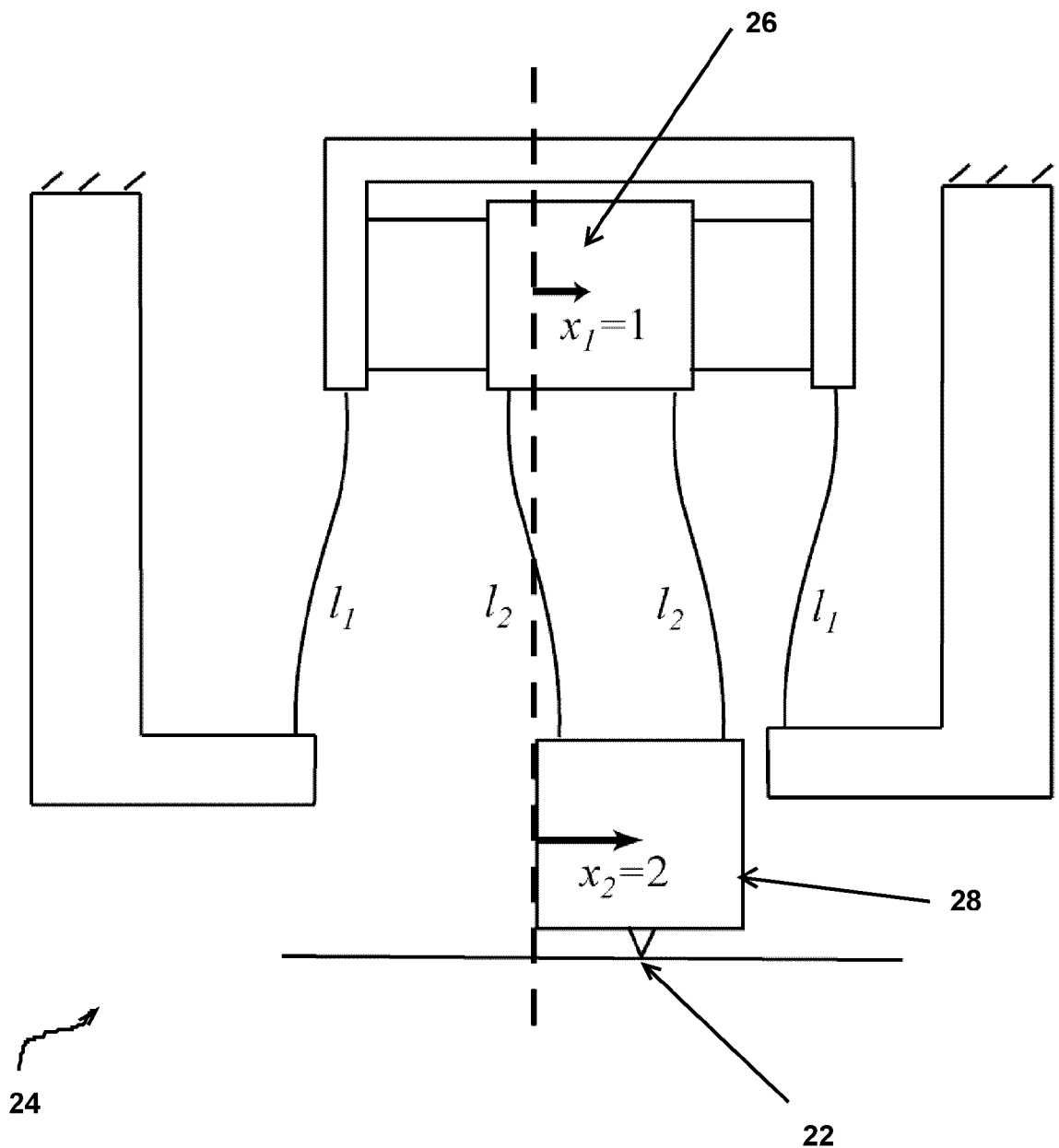
FIG. 21 further illustrates motion within the mechanical flexure suspension of FIG. 20.

FIG. 21 further illustrates motion within the mechanical flexure suspension 24 of FIG. 20. Specifically, for the probe tip 22 to experience no parasitic motion in the absolute z-axis during x-axis scanning, first, the lengths of the flexures $l_1$ and $l_2$ must be equal, and second, the mode shape for the first resonant frequency of the mechanical flexure suspension 24 must be $[1\ 2]^T$, meaning that when the scanner 20 is scanning at its resonant frequency, the second mass 28 must move two units in the absolute x axis for every one unit that m1 moves in the absolute x axis. For example, if the first mass 26 moves 25 μm in the +x direction, then the second mass 28 must move 50 μm in the +x direction. Therefore, referring to FIG. 21, if $|l_1|=|l_2|$ and $x_2=2x_1$, then there will be no parasitic motion in the z-axis during scanning.

It should be noted that one or more of several variations of the basic flexure configuration may be used by the mechanical flexure suspension 24. The following describes several variations; however, it should be noted that the flexure configurations described herein are not intended to limit the scope of flexure configurations that may be used in accordance with the present invention.

Figure 22A:
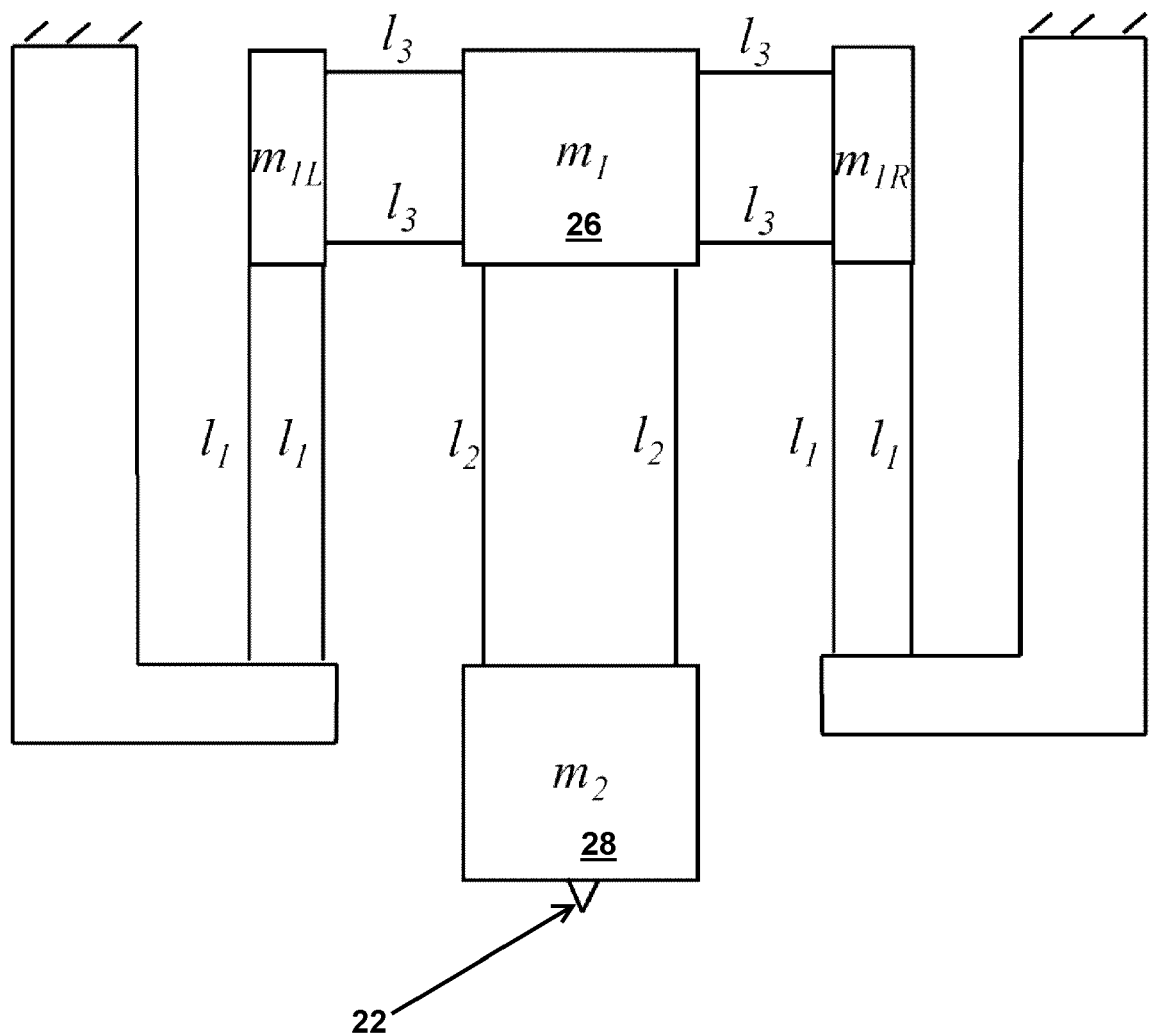
FIG. 22A is a schematic diagram illustrating a double flexure configuration version of the crossbar configuration of FIG. 19.

A first variation of the basic flexure configuration is a crossbar configuration. The crossbar configuration, as previously shown by FIGS. 19-21, connects the left $l_1$ flexure with the right $l_1$ flexure. Alternatively, a second variation of the basic flexure configuration is a double flexure configuration. FIG. 22A is a schematic diagram illustrating a double flexure configuration version of the crossbar configuration of FIG. 19. The double flexure sets for $l_1$ in FIG. 22A serve the same purpose as the crossbar structure of FIGS. 19-21. This purpose is to constrain the upper ends of the left $l_1$ flexures and the right $l_1$ flexures to have zero slope, meaning that the upper ends of the $l_1$ flexures are constrained to be parallel to the z-axis. This configuration ensures that the flexure suspension is stiff to moment disturbances at the first mass 26 and that there is no relative twisting between the two sides. If the structure were not stiff to moment disturbances at the first mass 26, rotation of the first mass 26 would ensue. This would lead to rotation of the second mass 28 and the probe tip 22, and would decrease accuracy.

The double flexure configuration shown by FIG. 22A has the advantage over the crossbar configuration of FIG. 19 of contributing less mass to the total upper mass ($m_1 + m_L + m_R$). The lower mass will in general lead to a higher resonant frequency, and thus, higher scanning speeds.

Figure 22B:
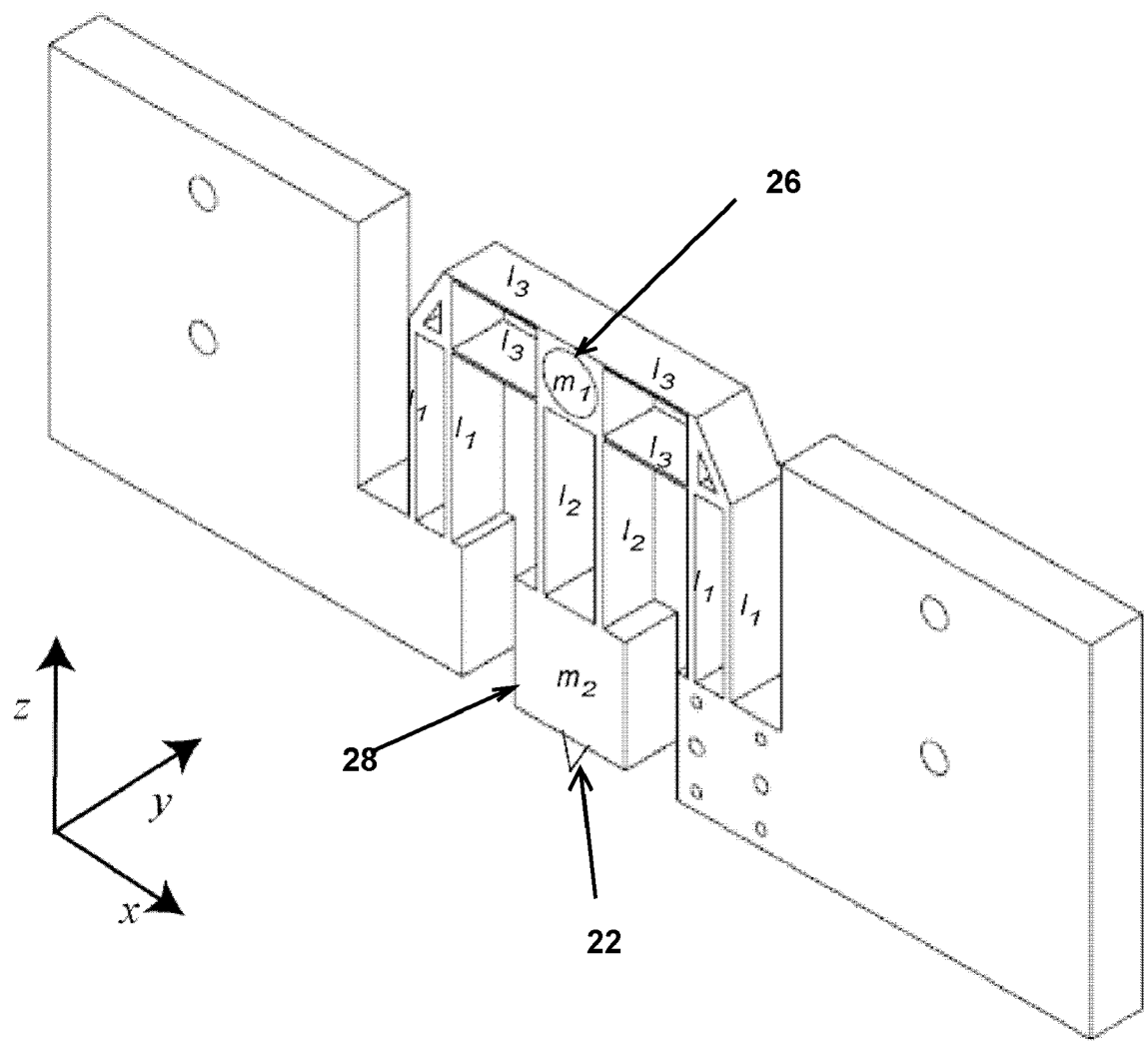
FIG. 22B is a schematic diagram illustrating a second double flexure configuration.

FIG. 22B is a schematic diagram illustrating a second double flexure configuration. In the double flexure configuration of FIG. 22B, the $l_3$ flexures are made soft in the z direction so that z direction actuation will consume minimal power. However, softer stiffness for these flexures will also mean that the suspension assembly is less stiff to moment disturbances at a first mass 26 and will lead to unwanted rotation at a second mass 28 both about the x-axis and the y-axis. This unwanted rotation is due to the long moment arm created by $l_2$ flexures, thus, the flexure configuration would be susceptible to the same problem as that confronted by the flexure configuration of FIG. 22A.

Figure 23:
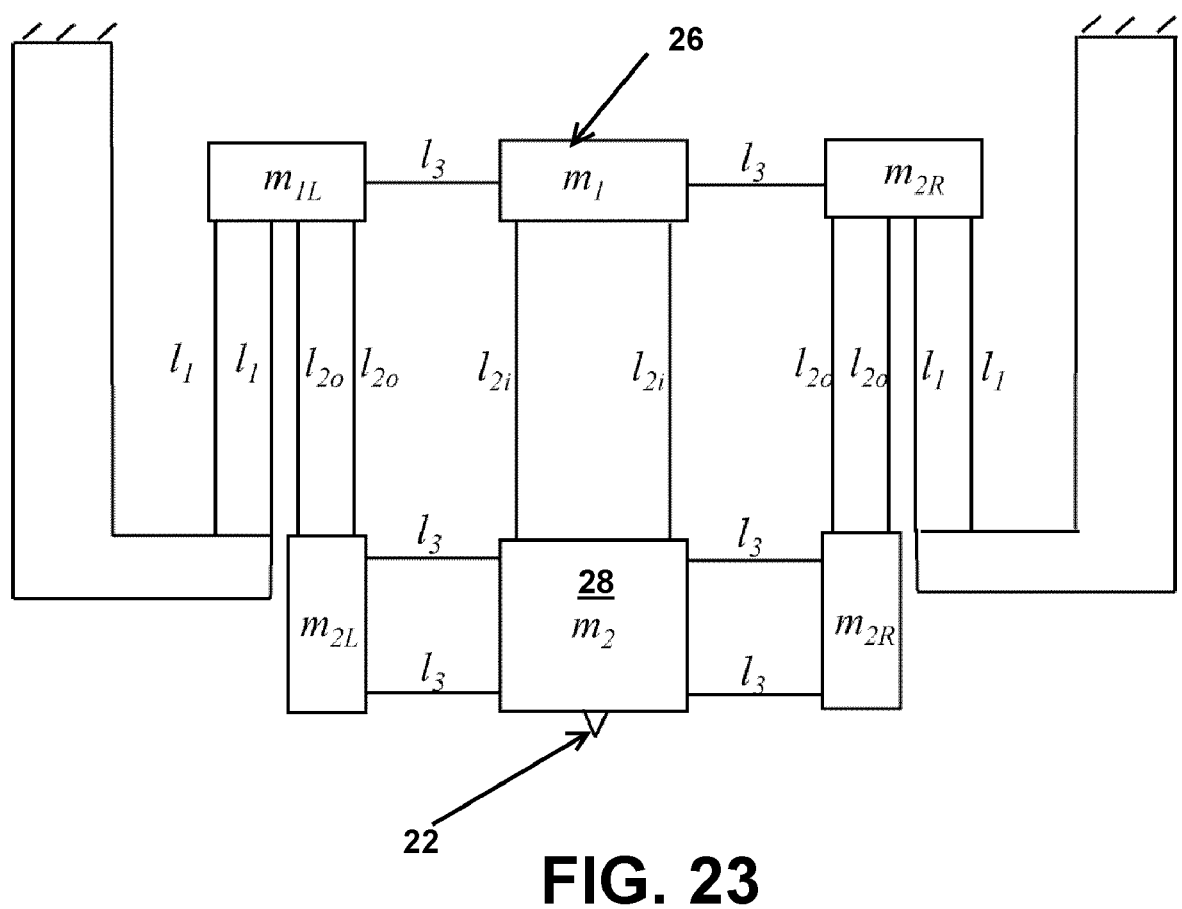
FIG. 23 is a schematic diagram illustrating a third variation of the basic flexure configuration that uses a lower flexure configuration.

A third variation of the basic flexure configuration uses a lower flexure configuration, an example of which is shown by the schematic diagram of FIG. 23. A lower flexure configuration resolves a tradeoff between low z direction actuation power and high moment stiffness by placing $l_3$ flexures at a second mass 28, in addition to $l_3$ flexures placed at a first mass 26. Placing flexures at this location makes the second mass 28 much less prone to rotations caused by moment disturbances transmitted to the first mass 26. A lower flexure configuration simultaneously permits the use of soft $l_3$ flexures to ensure minimal z-axis power consumption.

Figure 24:
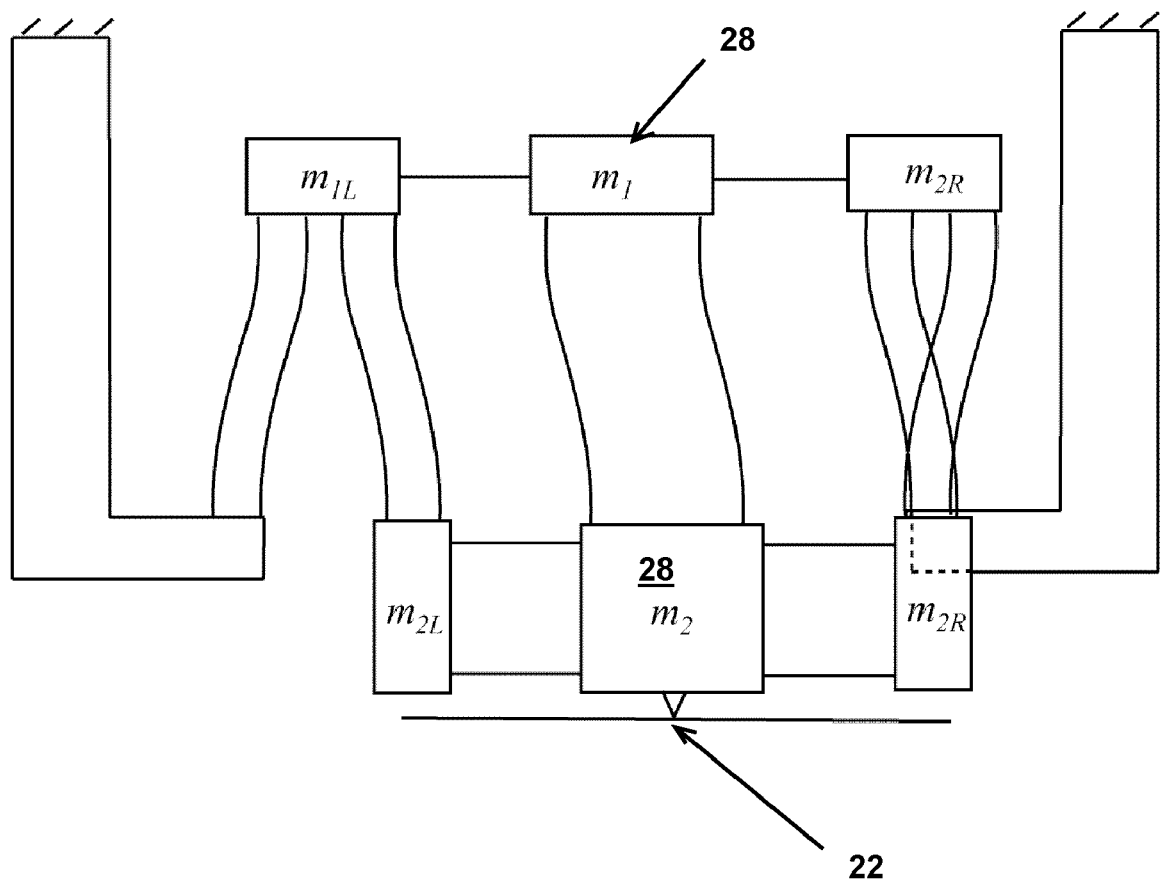
FIG. 24 is a schematic diagram illustrating the desired mode shape of the lower flexure configuration during x-axis resonant scanning.

As shown by FIG. 23, the outer $l_2$ flexures, labeled $l_{2o}$, are necessary in order to place $l_3$ flexures at the second mass 28. These $l_{2o}$ flexures are required to have zero slope boundary conditions at either end to ensure that no rotation is transmitted from the $l_{2o}$ flexures to the second mass 28. As with the $l_1$ flexures, this is accomplished by using double sets of flexures. As a result, there is a total of six $l_2$ flexures (four $l_{2o}$ flexures and two $l_{2i}$ flexures). FIG. 24 is a schematic diagram illustrating the desired mode shape of the lower flexure configuration during x-axis resonant scanning.

Figure 25:
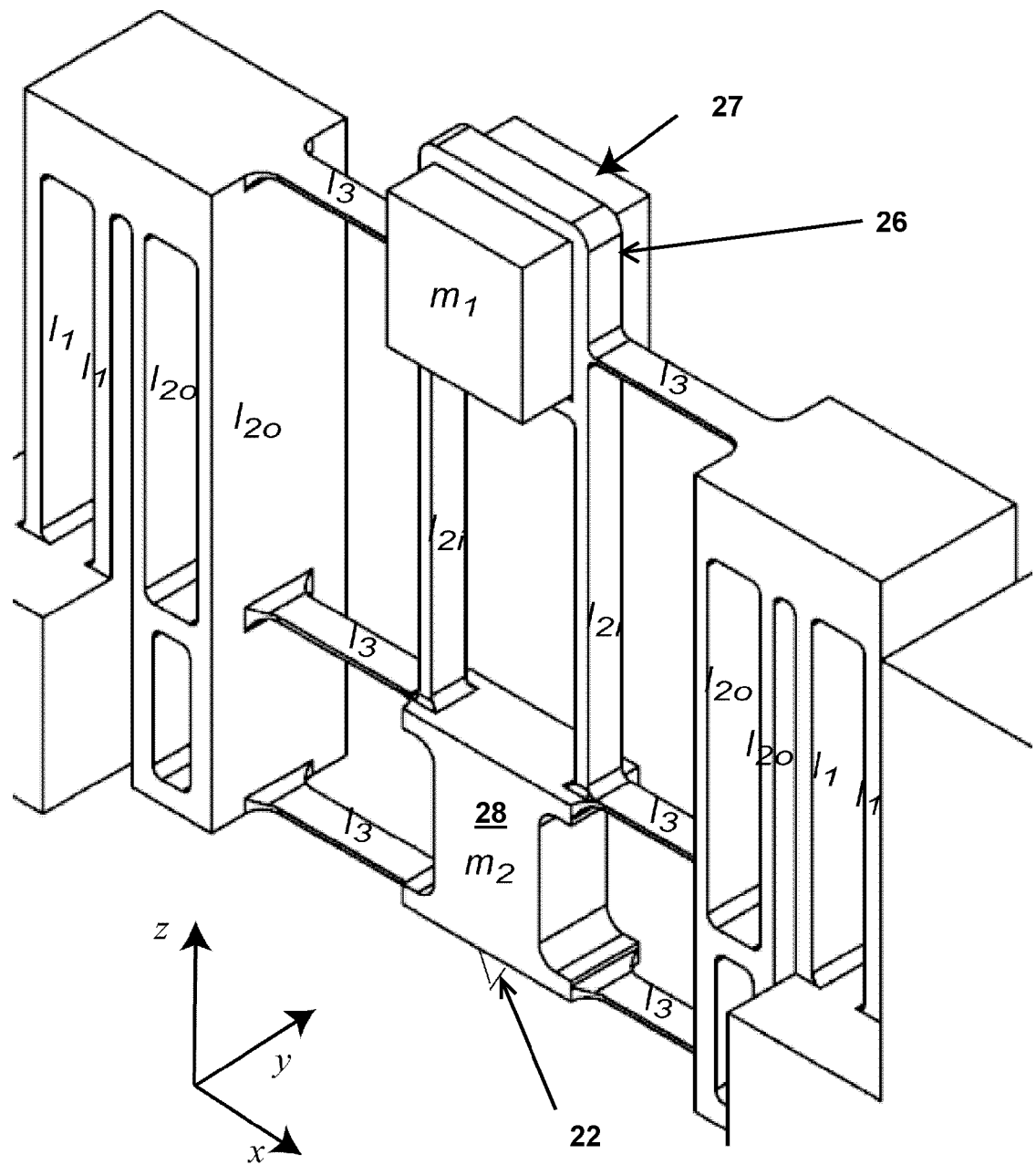
FIG. 25 is a schematic diagram illustrating an example of a mechanical flexure suspension having a flexure configuration that uses a lower flexure configuration.

FIG. 25 is a schematic diagram illustrating an example of a mechanical flexure suspension 24 having a flexure configuration that uses a lower flexure configuration. The permanent magnet 26 of the first mass is better illustrated by FIG. 25. This upper mass consists of a cube-shaped magnet 27 that is bonded to the flexure structure. The $l_1$ flexures are connected at bottom to a base frame that is stationary. The flexures $l_1$, $l_{2i}$, and $l_{2o}$ are sized so as to provide the desired $[1\ 2]^T$ mode shape when the x-axis is driven at resonance. These flexures bend in the x-direction when an x-force is applied to the upper magnet. Likewise, the bottom mass m2 is sized for the purpose of providing the desired mode shape. The mass m2 is connected to the $l_{2i}$ flexures via the bottom four $l_3$ flexures. These flexures along with the top two $l_3$ flexures can bend in the z-direction to allow motion in the z-axis.

Figure 26:
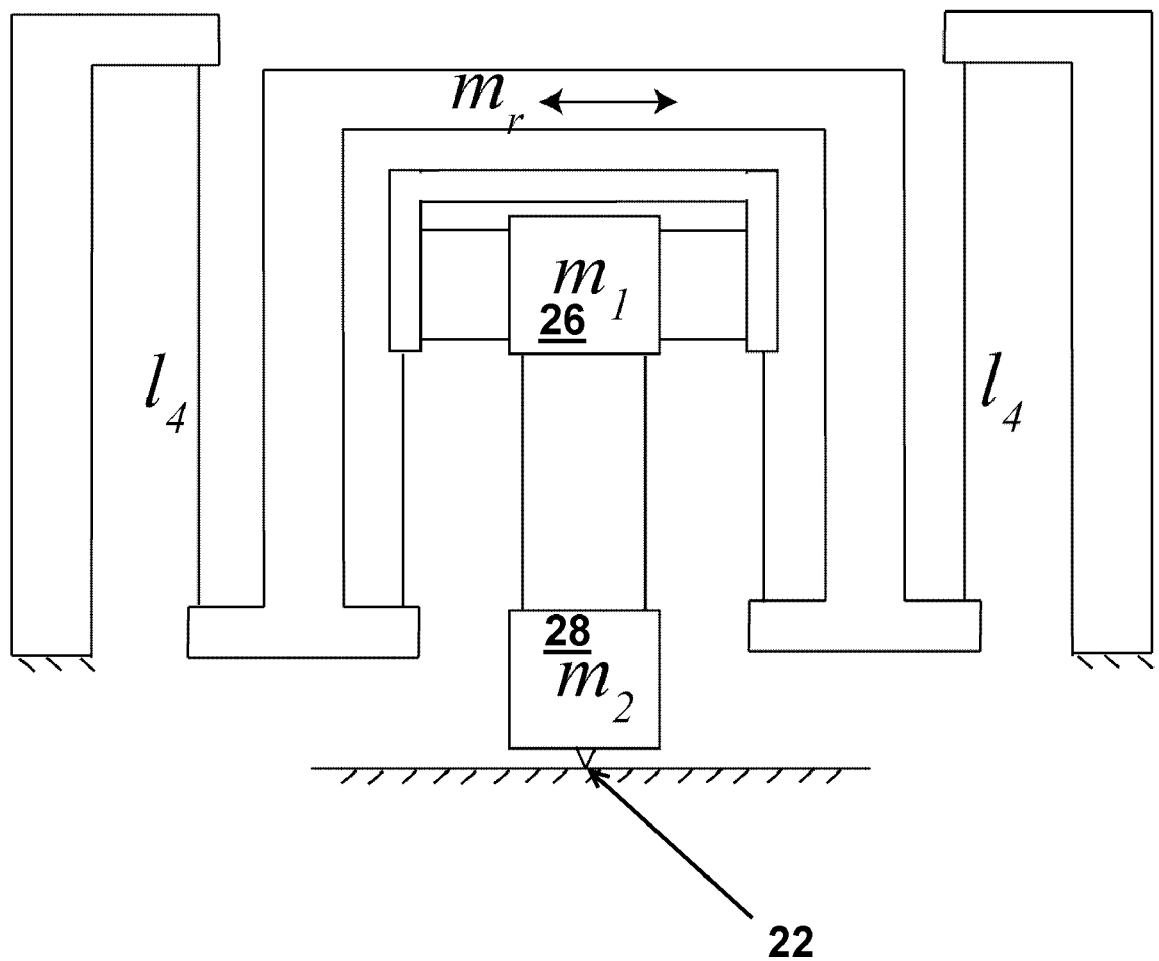
FIG. 26 is a schematic diagram illustrating a fourth variation of the basic flexure configuration that uses a reactionless flexure configuration.

A fourth variation of the basic flexure configuration uses a reactionless flexure configuration, as shown by the schematic diagram of FIG. 26. The reactionless flexure configuration is an adaptation of the crossbar flexure configuration of FIG. 19. It should be noted, however, that the both the double flexure configuration and the lower flexure configuration can both be modified to be reactionless scanners as well.

Figure 29:
FIG. 29 illustrates a mechanical ground symbol, which represents a rigid machine frame.

As shown by FIG. 26, in the reactionless flexure configuration the base frame is mounted in its own flexures, labeled $l_4$. The $l_4$ flexures allow structure $m_r$ to move in the x direction and serve as a reaction mass. Vibrations arising from the scanner motion are transmitted to the machine frame via the $l_4$ flexures. The machine frame is the structure that attaches to the mechanical flexure suspension and holds it in place. The machine frame is represented by the mechanical ground symbol in FIG. 29. The machine frame may include the structure that carries the actuator halves. It may include many other elements as well, including but not limited to the structure that holds the metrology elements and the structure that holds the instrumentation.

These vibrations can inject disturbances into other subsystems within the scanning microscope and accuracy will suffer. The reaction mass essentially serves as a low pass filter by attenuating these vibrations before they are transmitted to the machine frame, thus mitigating the effect these vibrations have on other subsystems. For scanning accuracy, structure $m_r$ should be made much larger than $m_1 + m_2$, so that the motion on $m_r$ will be negligible. The magnetic actuator coils can be mounted on the structure $m_r$ to increase the reaction mass.

Figure 27:
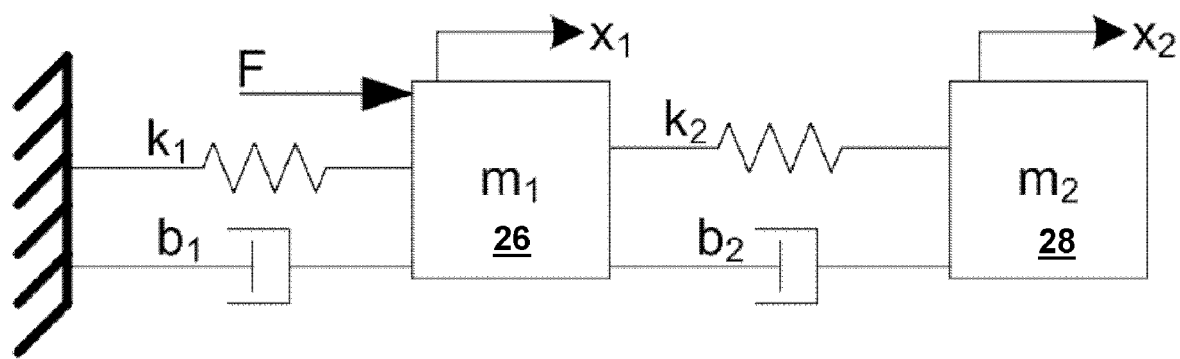
FIG. 27 is a schematic diagram illustrating a two-stage spring-mass-damper system.

The following further describes how the flexure suspension is modeled in order to design the flexure suspension to achieve the intended motion. For exemplary purposes, the following description is with regard to the flexure designs of FIG. 22B and FIG. 25. For motion in the x-axis, the flexure design shown in FIG. 22B and FIG. 25 can be modeled as a two-stage spring-mass-damper system, as shown by FIG. 27. For the flexure design of FIG. 22B, $k_1$ represents the total stiffness of the $l_1$ flexures, and $k_2$ represents the total stiffness of the $l_2$ flexures. For the flexure design of FIG. 25, $k_1$ represents the total stiffness of the four outermost flexures ($l_1$) that are attached to the base, and $k_2$ represents the total stiffness of six innermost flexures ($l_{2i}$ and $l_{2o}$) that are free of the base. The actuation force is applied to the first mass 26 and the resultant motion is sensed on the second mass 28, which will ultimately carry the probe tip 22.

The model of FIG. 27 is represented by state-space equations as shown by equation 1 below.

$$\begin{bmatrix} \dot{x}_1 \\ \ddot{x}_1 \\ \dot{x}_2 \\ \ddot{x}_2 \end{bmatrix} = \begin{bmatrix} 0 & 1 & 0 & 0 \\ -\frac{(k_1+k_2)}{m_1} & -\frac{(b_1+b_2)}{m_1} & \frac{k_2}{m_1} & \frac{b_2}{m1} \\ 0 & 0 & 0 & 1 \\ \frac{k_2}{m_2} & \frac{b_2}{m_2} & -\frac{k_2}{m_2} & -\frac{b_2}{m_2} \end{bmatrix} \begin{bmatrix} x_1 \\ \dot{x}_1 \\ x_2 \\ \dot{x}_2 \end{bmatrix} + \begin{bmatrix} 0 \\ \frac{1}{m_1} \\ 0 \\ 0 \end{bmatrix} f \quad \text{(Eq. 1)}$$

Under the simplified assumption of no damping, which is valid for this lightly-damped flexure mechanism, equation 1 can be rewritten in second-order form as shown by equation 2 below.

$$\begin{bmatrix} m_1 & 0 \\ 0 & m_2 \end{bmatrix} \begin{bmatrix} \ddot{x}_1 \\ \ddot{x}_2 \end{bmatrix} + \begin{bmatrix} k_1+k_2 & -k_2 \\ -k_2 & k_2 \end{bmatrix} \begin{bmatrix} x_1 \\ x_2 \end{bmatrix} = \begin{bmatrix} f \\ 0 \end{bmatrix} \quad \text{(Eq. 2)}$$

Solving this in the unforced case gives two modal frequencies $\omega_1$ and $\omega_2$, which are associated with modes in which the masses move in-phase and in anti-phase, respectively. The desired scan mode is in the in-phase with natural frequency defined as $\omega_1$. The second mode, with natural frequency defined as $\omega_2$, is located with enough separation in frequency from $\omega_1$ to allow direct control of the first mode for scanning.

The first mode shape is also in the ratio $[1\ 2]^T$. This is present so that the two vertical flexure sets (represented by $k_1$ and $k_2$ in the model, respectively) have equal x-axis deflections, and thus have z-axis deflections which cancel. This permits m2 to move without vertical motion while scanning and decouples the x-axis motion from the z-axis motion.

To meet these requirements, the natural frequencies are found as the solution to equation 3 below.

$$\begin{vmatrix} k_1 + k_2 - m_1\omega^2 & -k_2 \\ -k_2 & k_2 - m_2\omega^2 \end{vmatrix} = 0 \qquad \text{(Eq. 3)}$$

The mode shapes defined as vector $v=[c_1\ c_2]^T$ for a given $\omega$ are found via equation 4 below.

$$-c_1 k_2 + c_2(k_1 - m_2\omega^2) = 0 \Rightarrow \bar{v} = \begin{bmatrix} 1 \\ \dfrac{k_2}{k_2 - m_2\omega^2} \end{bmatrix} \qquad \text{(Eq. 4)}$$

In order to design for a desired mode shape where the x1-x2 relationship is known, the relative motion is non-dimensionalized, thus allowing the dependence of modal separation and stiffness ratios to be explored independent of specific mechanical parameters. The mode shapes given via equation 4 are non-dimensionalized by dividing equations 3 and 4 by $k_2/m_1$, which yields equation 5 below.

$$-\frac{c_2}{c_1} = \frac{1}{1 - m\omega^2} \qquad \text{(Eq. 5)}$$

where $m=m_2/m_1$.

Assuming equal masses ($m_1=m_2$) and the $[1\ 2]^T$ modal shape, we get $\omega_2/\omega_1=2.45$ and $k=k_1/k_2=1.5$. This separation in modal frequencies and stiffness ratios is acceptable and amenable to designing a scanning configuration. This $[1\ 2]^T$ mode shape is shown in FIG. 20 for a simplified mechanical flexure suspension 24 configuration.

Figure 28:
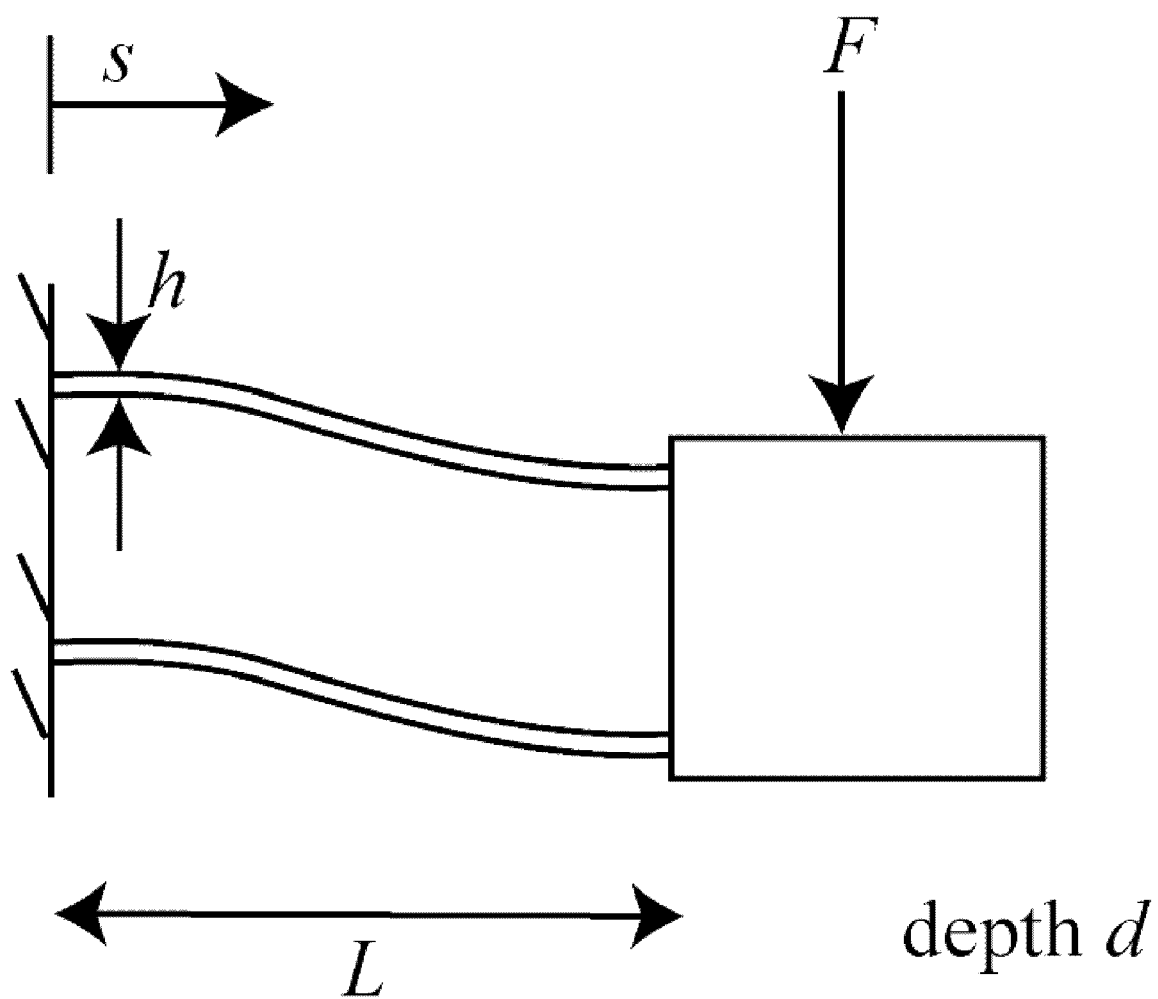
FIG. 28 illustrates boundary conditions for a pair of flexures that are fixed at one end and where there is zero slope at the other end.

To determine the x-axis stiffness of the vertical flexures, each vertical flexure set is modeled as parallel cantilever beams mechanically grounded at one end and attached to a common mass at the other end. This results in the following boundary conditions: fixed at one end and zero slope at the other end, an example of which is illustrated by the schematic diagram of FIG. 28. For a single beam with these constraints and a transverse end-load, the transverse displacement, w, is given by equation 6 below, where L is the length of the beam, h is the height or thickness of the beam along the axis of the applied force, d is the beam out-of-plane depth, E is the material Young Modulus, I is the area moment of inertia of the beam, and s is the position along the longitudinal axis measured from the fixed end. The stiffness for a single cantilever is then given by equation 7 below.

$$w(s) = \frac{Fs^2}{2EI}\left(\frac{s}{3} - \frac{L}{2}\right) \qquad \text{(Eq. 6)}$$

$$k_x = \frac{Eh^3 d}{L^3} \qquad \text{(Eq. 7)}$$

From this result, the x-axis stiffness of each vertical flexure set can be determined by simply summing together the stiffness of each individual beam in each flexure set. The out-of-phase stiffness of the vertical flexure sets, denoted $k_y$, by the coordinate axes convention in FIG. 25, is calculated by modeling the flexures as fixed-free beams in parallel. The out-of-plane stiffness for a single beam with these boundary conditions is given by equation 8 below.

$$k_y = \frac{Ed^3}{4L^3} \qquad \text{(Eq. 8)}$$

Equation 8 is adapted to each vertical flexure set to determine its out-of-plane stiffness. The flexures are designed to have out-of-plane stiffness be much higher than x-axis stiffness, so that parasitic motion in the y-axis will be negligible.

The horizontal flexures are modeled as beams that are free to slide in the direction of longitudinal axis of the beam at the outer ends, but not in the direction transverse to this axis (they are constrained by the vertical flexures in this direction). Each end is also constrained to have zero slope. The force is applied at the beam midpoint where the modeled point mass m1 or m2 is located. The derivation of the stiffness in this scenario is the same as that of a fixed-fixed beam flexure subjected to a midpoint load and with the first-order assumption that there is bending but no stretching.

Starting with a single beam of length 2L, the in-plane stiffness is obtained from equation 9 below. This equation is then adapted to the multiple flexure case to find the z-axis stiffness of horizontal flexure set.

$$k_z = \frac{2Eh^3 d}{L^3} \qquad \text{(Eq. 9)}$$

The out-of-phase stiffness for the horizontal flexures, along the y-axis, is calculated by modeling the flexures as fixed-fixed beams and again using equation 9, but with the d and h parameters switched. The horizontal flexures are designed to have high stiffness in the y-axis relative to that in the z-axis.

Controlling the motion of the probe tip 22 can be accomplished via feedback control, a well-known method in the controls field. The position of the tip in the z(x) direction is measured with a position sensor, such as, but not limited to, a capacitance probe, linear scales, or a laser interferometer. The measured position is compared to the desired tip position in z(x), which is typically stored in a computer. The error between the measured position and the desired position is fed into a controller in the computer. This controller then sends a signal to the z(x) axis amplifier to produce a corrective amount of current through the z(x) axis actuator coils. This corrective current in turn produces a corrective force that moves the tip to the desired z(x) position. This process is repeated for each clock signal on the computer.

The x-axis motion feedback control can be augmented with more advanced controllers that automatically find the x-axis resonance frequency and drive this axis at this frequency. These possibilities, which include such methods as parametric amplitude controllers and phase-lock loops, are familiar to those versed in the control field.

Other control methods can be used instead of, or in conjunction with, those mentioned above. These include feedforward control and input shaping, among other methods.

While the abovementioned provides description of general embodiments of the invention, the following further describes alternative embodiments of the invention.

Figure 30:
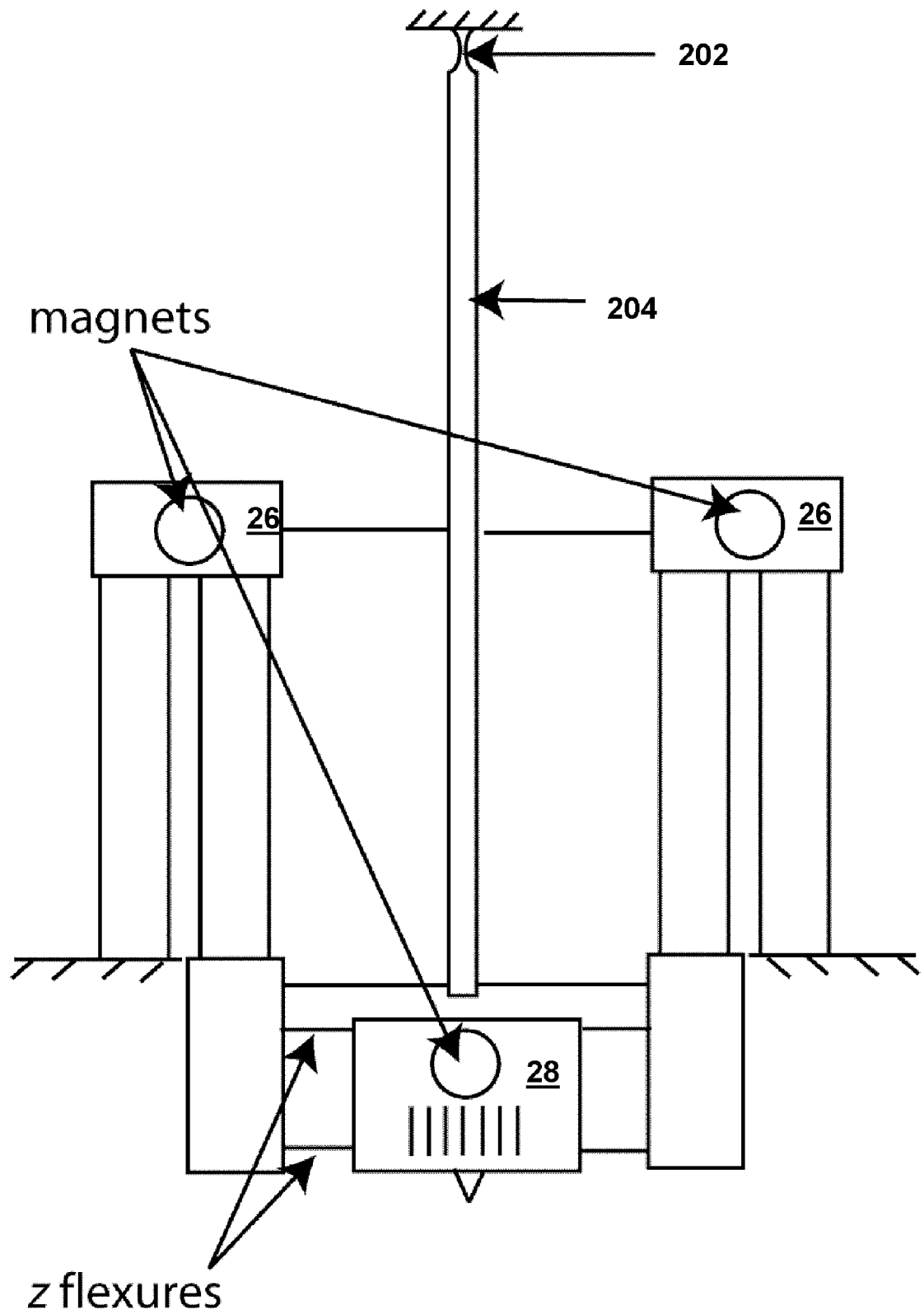
FIG. 30 is a schematic diagram illustrating a mechanical scanner configuration that utilizes a hinge joint.

FIG. 30 is a schematic diagram illustrating a mechanical scanner configuration that utilizes a hinge joint 202. The configuration shown in FIG. 30 uses a lever 204 attached to the hinge joint 204. The hinge joint 202 is attached at its full length to the bottom mass 28 and at half its full length to the top mass structure 26. Thus, the lever 204 will force the bottom mass 28 to move in a 2:1 ratio with the top mass 26 due to the 2:1 length ratio of the lever attachments. By imposing this 2:1 constraint, parasitic motion in the z-axis can be mitigated further during x-axis scanning. The actuation scheme in this configuration is also different in order to incorporate the lever. In this particular implementation, two magnets at the top provide forces in the x-axis, while one magnet at the bottom mass provide forces in the z-axis. The z axis flexures are located at the bottom mass 28, rather than at the top mass 26. Other actuator configurations in conjunction with the hinge 202 and lever 204 can be provided.

Figure 31:
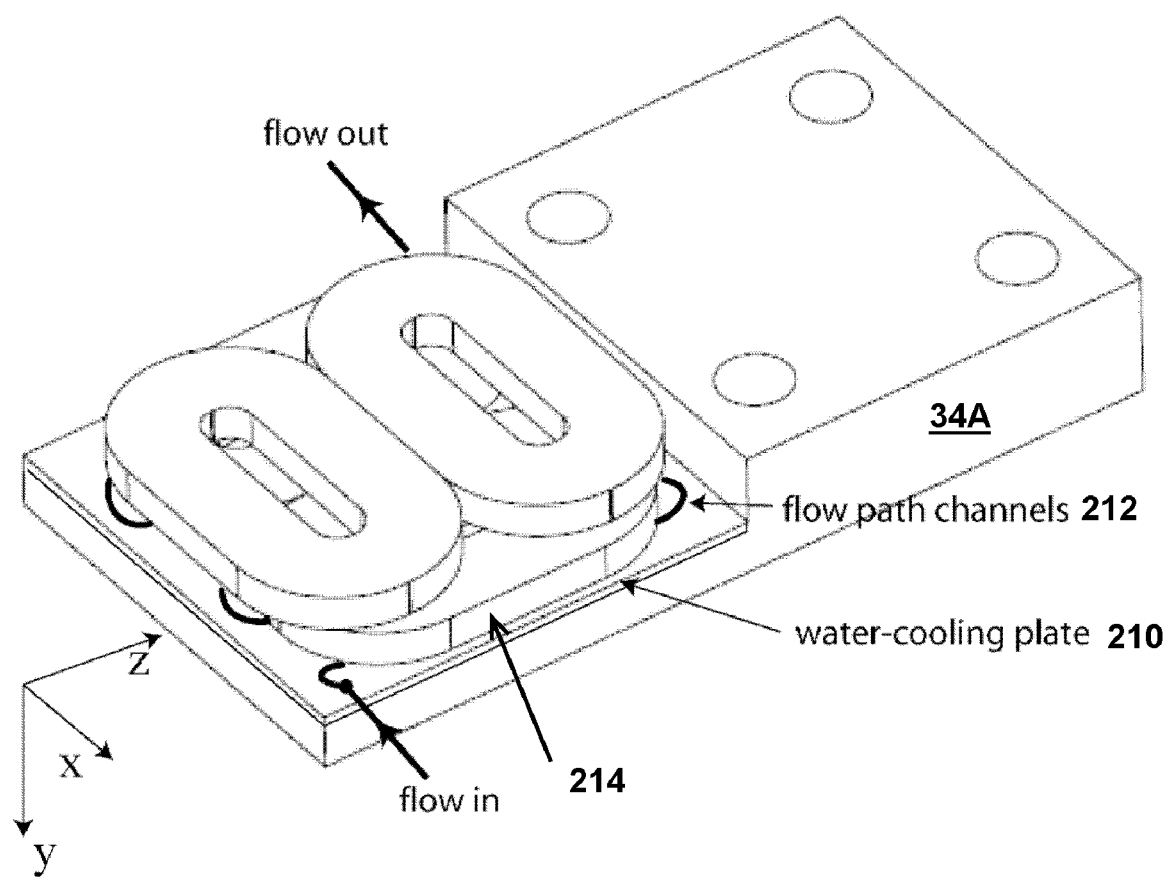
FIG. 31 is a schematic diagram illustrating a plate with flow-channels providing cooling to lower coils.

FIG. 31 is a schematic diagram illustrating a plate 210 with flow-channels 212 providing cooling to lower coils 214. One variation on the actuator design is to provide cooling channels 212 for liquid, such as, but not limited to, water or some other fluid, on the underside of the bottom coils 214. FIG. 31 shows such a configuration with the stacked coil actuator design. Providing cooling permits higher current densities without overheating, which leads to higher actuation forces provided to the scanner. In this configuration, heat is drawn from the coils into the fluid, thereby allowing the coils to operate at a lower temperature or allowing a higher upper current and force limit.

The flow channels 212 are sealed in a thin plate or pipe and sandwiched between the actuator coils 214 and the actuator steel backing 34A. Cooling liquid enters an opening in the channel 212 from a flow source (not shown), travels through the channel 212, while drawing heat away from the coils 214, and then exits the flow path at the other channel opening. At this point, the liquid is either discarded or returned and recirculated back to the flow channel entrance.

Figure 32:
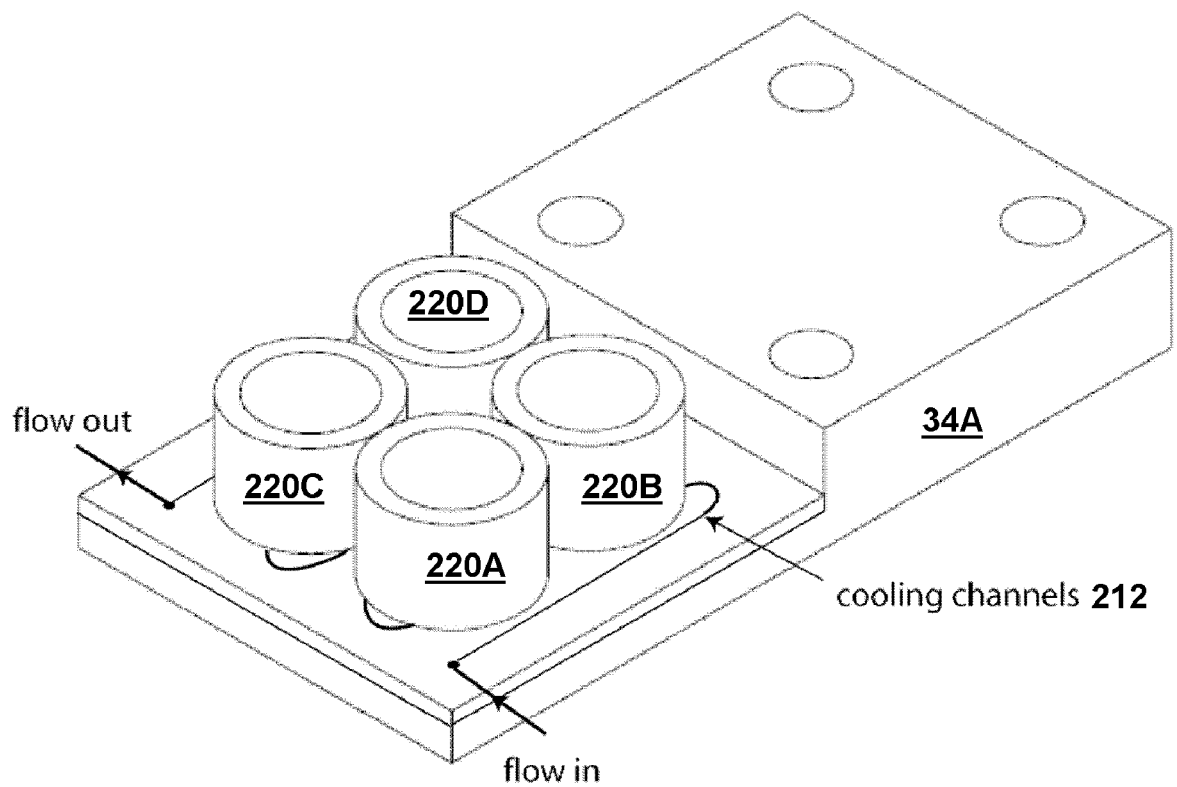
FIG. 32 is a schematic diagram illustrating cooling coils with the pancake coil actuator design.

FIG. 32 is a schematic diagram illustrating cooling coils with the pancake coil actuator design. In this configuration, as with the configuration in FIG. 31, heat is drawn from the coils 220A, 220B, 220C, 220D into the fluid in the cooling channels 212, thereby allowing the coils 220 to operate at a lower temperature or allowing a higher upper current and force limit. The flow channels 212 are sealed in a thin plate or pipe and sandwiched between the actuator coils 220 and the actuator steel backing 34A. Cooling liquid enters an opening in the channel 212 from a flow source (not shown), travels through the channel 212, while drawing heat away from the coils 220, and then exits the flow path at the other channel opening. At this point, the liquid is either discarded or returned and recirculated back to the flow channel entrance.

Figure 33:
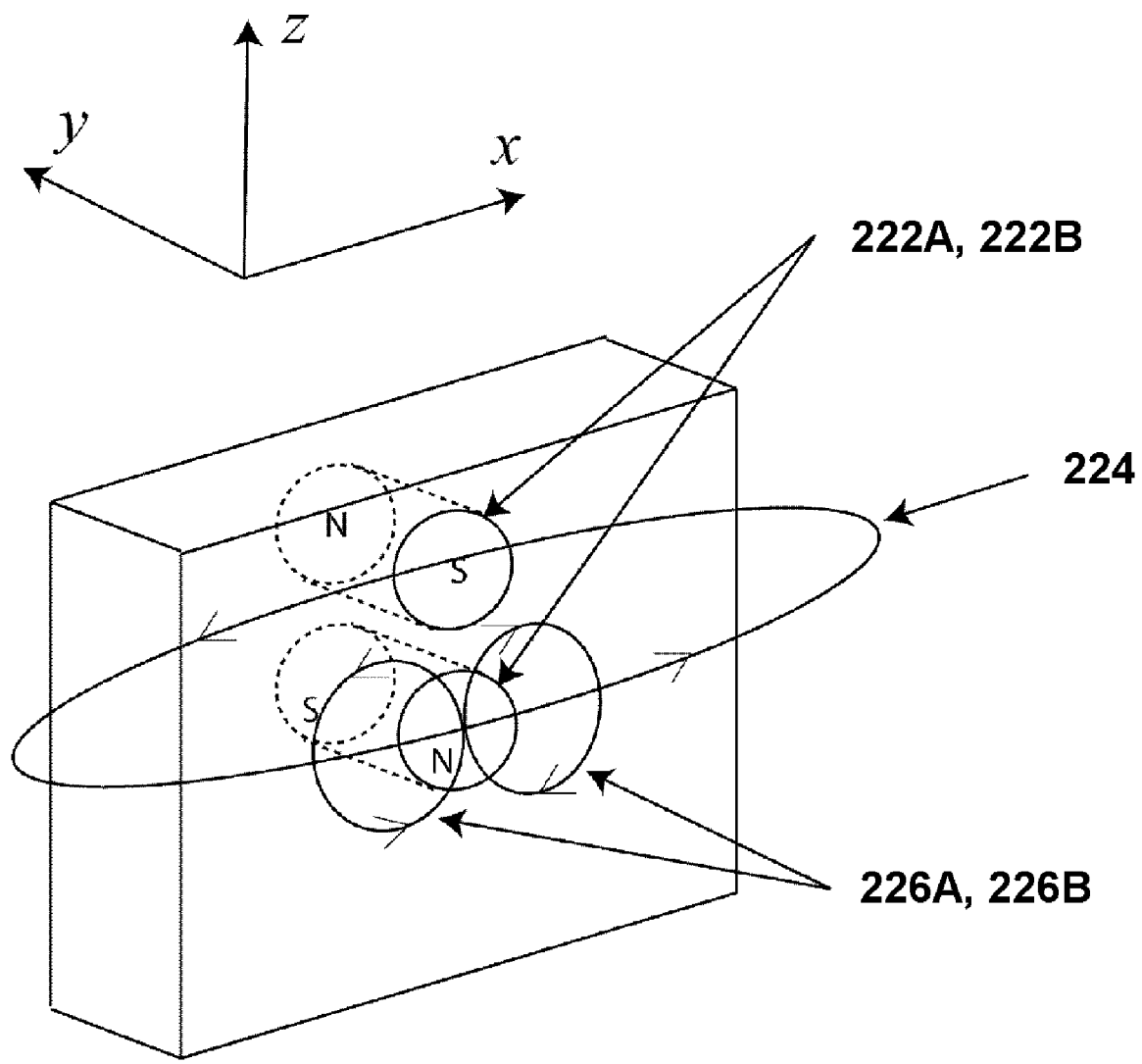
FIG. 33 is a schematic diagram of an actuator implementation where the top mass (m1) contains two magnets, rather than one.

FIG. 33 is a schematic diagram of an actuator implementation where the top mass (m1) contains two magnets 222A, 222B, rather than one. The two magnets are magnetized in opposite directions, denoted by 'N' and 'S' in the figure to indicate north and south poles, respectively. This permits both sides of one coil 224 to provide double the force in the z-direction. This is the horizontally-oriented coil pictured in the figure. The z-coil is able to produce double the force for the same amount of current, because the coil interacts with two magnets rather than one, and thus interacts with twice the magnetic field.

The x-actuation is provided as before, with two coils acting on one of the magnets (the lower magnet in the figure). A symmetric coil configuration on the backside of the mass is not shown. Current direction in the coils is indicated in the figure by the arrows. To reverse the direction of the x-axis force, the currents in the two x-axis coils 226A, 226B are reversed. Likewise, to reverse the direction of the z-axis force, the current in the one z-axis coil is reversed. The forces are produced via the interaction between the current in the actuator coils and the magnetic field from the magnets, as described previously.

A variation on this configuration is to rotate the magnets 90 degrees with respect to each other so that they are in-line horizontally (x-direction) rather than vertically (z-direction). Then one coil can be used to provide double the force in the x-direction rather than in the z-direction.

Figure 34:
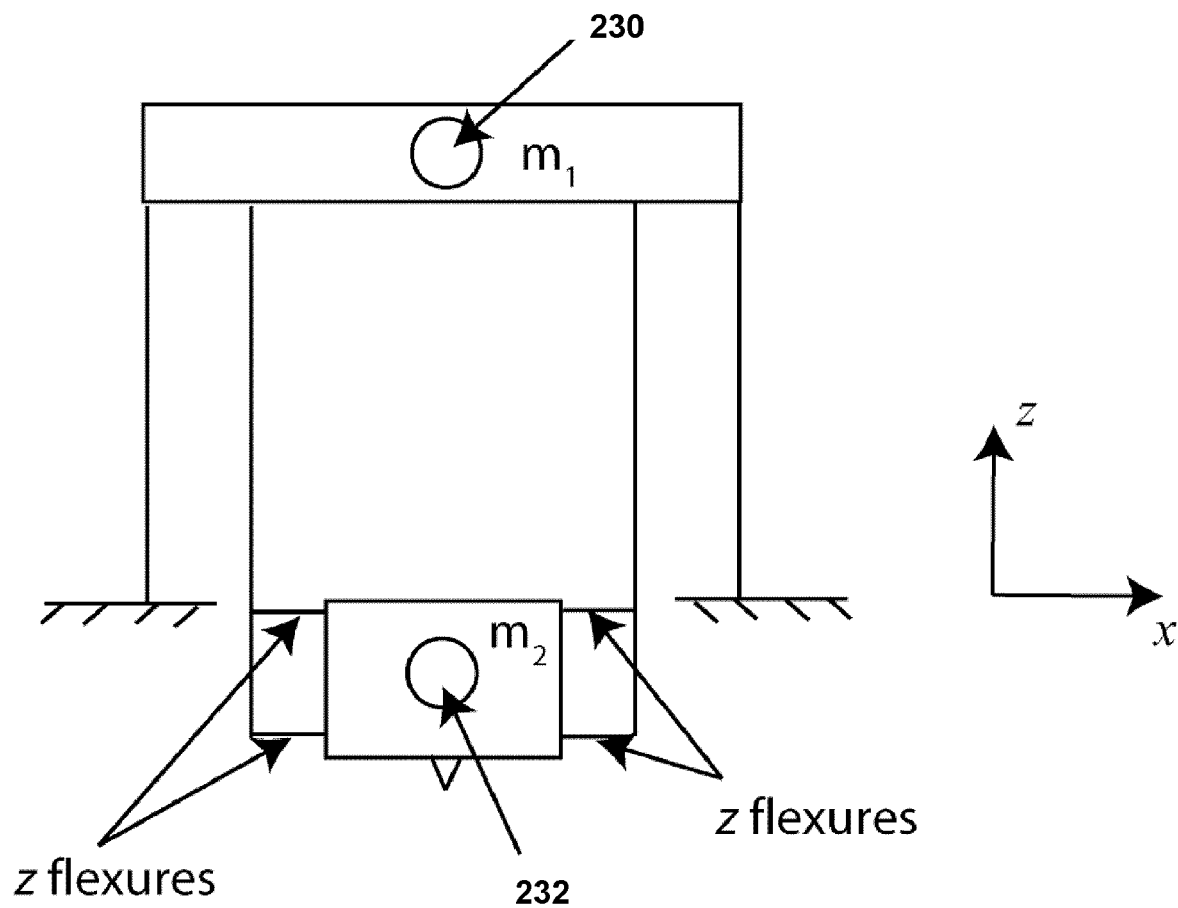
FIG. 34 is a schematic diagram illustrating a mechanical flexure suspension implementation where there is one magnet on the upper mass and one magnet on the lower mass.

FIG. 34 is a schematic diagram illustrating a mechanical flexure suspension implementation where there is one magnet 230 on the upper mass $m_1$ and one magnet 232 on the lower mass $m_2$. It should be noted that the mechanical configuration is slightly changed: there are z-flexures at the lower mass, but not at the upper mass. The magnet on each mass allows the x-motion to be controlled independently at each mass. If there are x-axis sensors at both the upper and lower mass (not shown), then the magnet on each mass allows the x-motion to be controlled independently at each mass. This would permit better control of the 1:2 mode shape, which will reduce parasitic z-motion further. The z-actuation is provided only at the lower mass, since there are no z-axis flexures at the top mass. Thus, a 2 DOF motor is required for the bottom magnet, but only a 1 DOF motor is required at the top magnet. Another advantage this actuation scheme poses is that since z-actuation only drives the bottom mass and not the top mass, the total mass for z-actuation is less, and the bandwidth can be increased (note that it is not necessary to drive both masses in the x-axis to retain this advantage).

Figure 35:
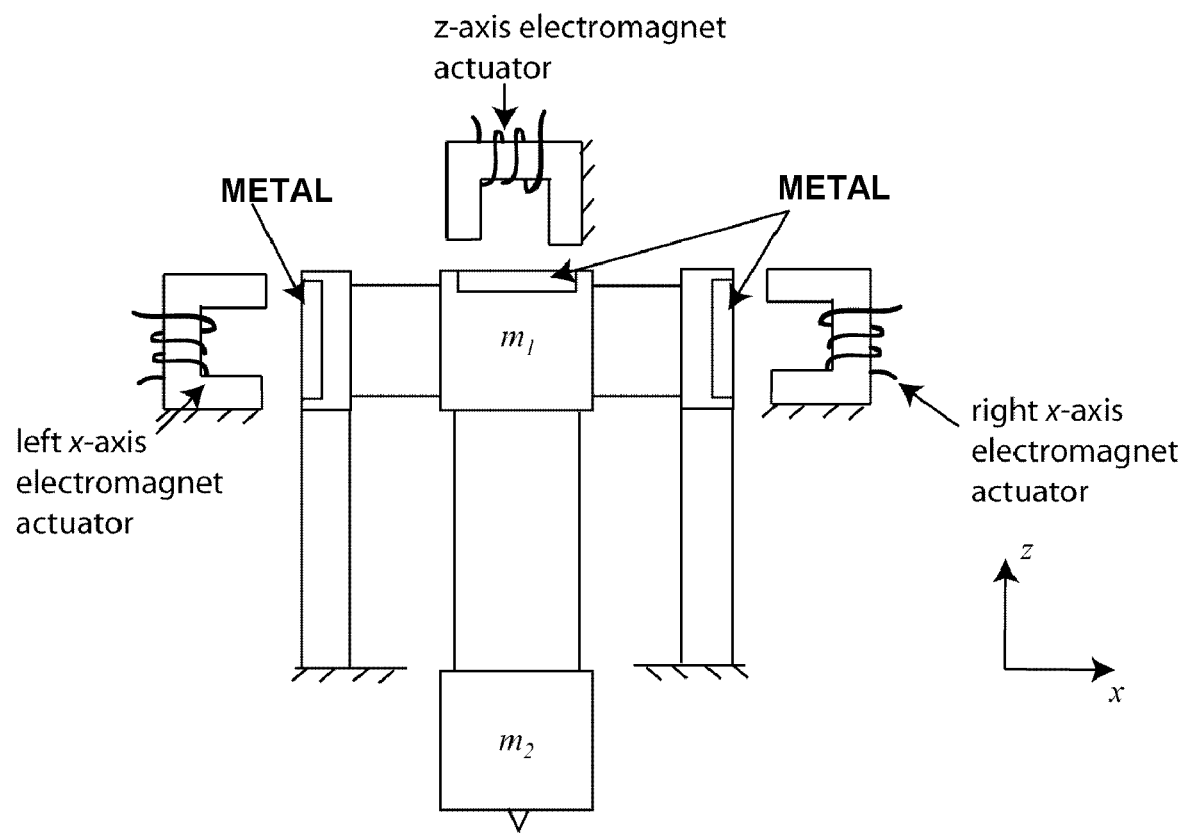
FIG. 35 is a schematic diagram illustrating electromagnets consisting of a steel core and a wound coil providing forces in both axes, replacing Lorentz actuators.

FIG. 35 is a schematic diagram illustrating electromagnets having a steel core and a wound coil providing forces in both axes, replacing Lorentz actuators. The core can be made of steel or some other highly magnetically permeable material. On the flexure suspension there are metal inserts that can be made of steel or some other highly magnetically permeable material. These inserts are necessary for the electromagnetics to generate force on the flexure suspension. The forces in FIG. 35 can be controlled by controlling the currents in the coils. Electromagnetic actuators can provide much higher force densities than Lorentz actuators, however, they are highly nonlinear. Another advantage of electromagnetic actuators is that, if the whole flexure is made in steel or some other highly magnetically permeable material, the mechanical flexure suspension can be entirely monolithic (i.e., made out of one part without the metal inserts). Additionally, no magnets are necessary for this configuration, and so no bonding (e.g., gluing) is needed.

Figure 36:
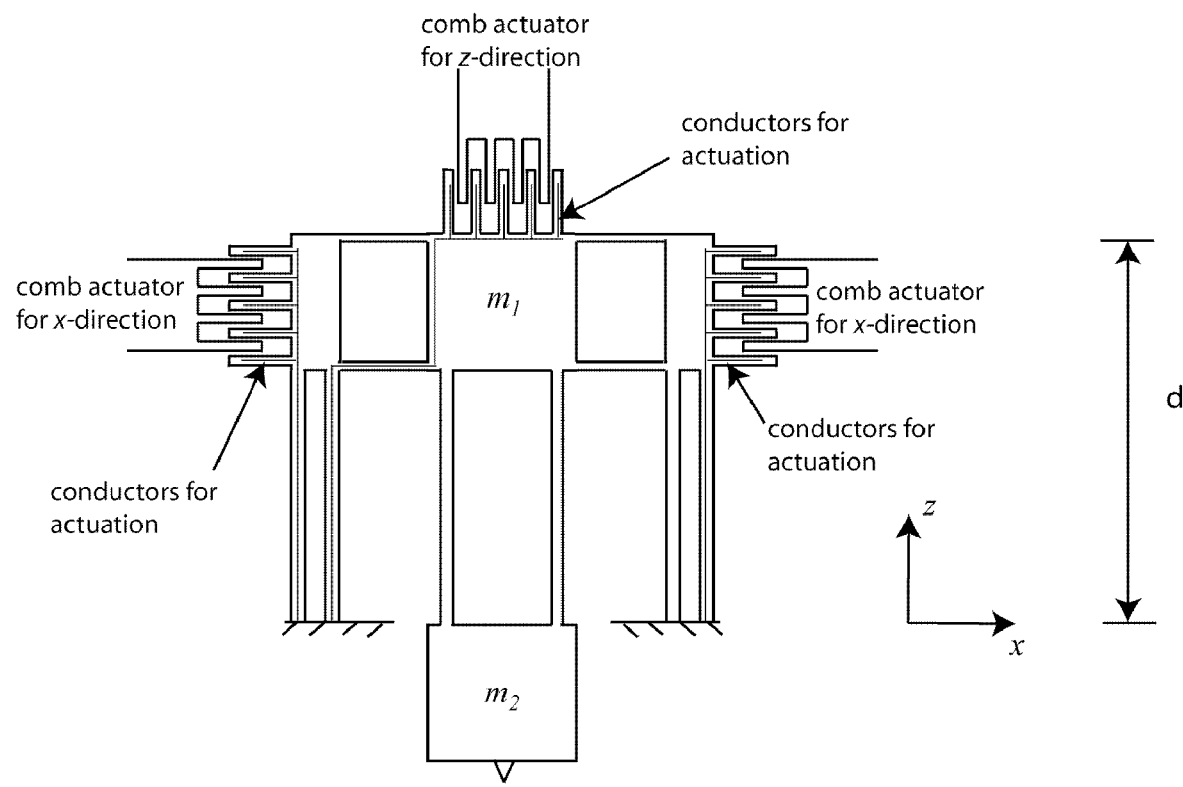
FIG. 36 is a schematic diagram illustrating an electrostatic comb actuator providing driving forces in the x- and z axes.

FIG. 36 is a schematic diagram illustrating an electrostatic comb actuator providing driving forces in the x- and z axes. FIG. 36 shows an implementation where electrostatic comb structures are used to provide forces to the scanner. Electrostatic actuators, well known in the art, work on the principle of the force between electric charges. A voltage is applied between each set of combs, which induces a force between the two sets. The comb structures increase the surface area available for total force generation. Conductors (equivalent to wires) are deposited on the comb fingers of the flexure to sustain the necessary voltages for force generation. These conductors are brought out via the flexures, where they are connected to a voltage or current drive (not shown) located away from the flexure suspension. Electrostatic actuators are typically efficient at micro scales, but become less efficient at larger scales, so this configuration would be amenable to MEMS (micro electromechanical systems) design.

MEMS fabrication processes are well known and would be very amenable to making the structure shown in FIG. 36. The MEMS structure can be made very compact, which results in high structural resonant frequencies, which in turn increases the speed of scanning. The dimension d for instance can be on the order of 1 mm to 10 mm.

Position sensing can also be done with MEMS. For instance, comb structures can double as both actuators and sensors. The position sensor works as a type of capacitive sensor. As the comb fingers move relative to one another, the capacitance between them changes, which induces a change in voltage between the finger electrodes. A circuit (not shown) to measure the voltage can be connected to the conductors and located away from the flexure. Electrostatic sensing in this manner is well-known in the field. It should be noted that MEMS technology can also be used to fabricate an encoder grid for position sensing.

Figure 37:
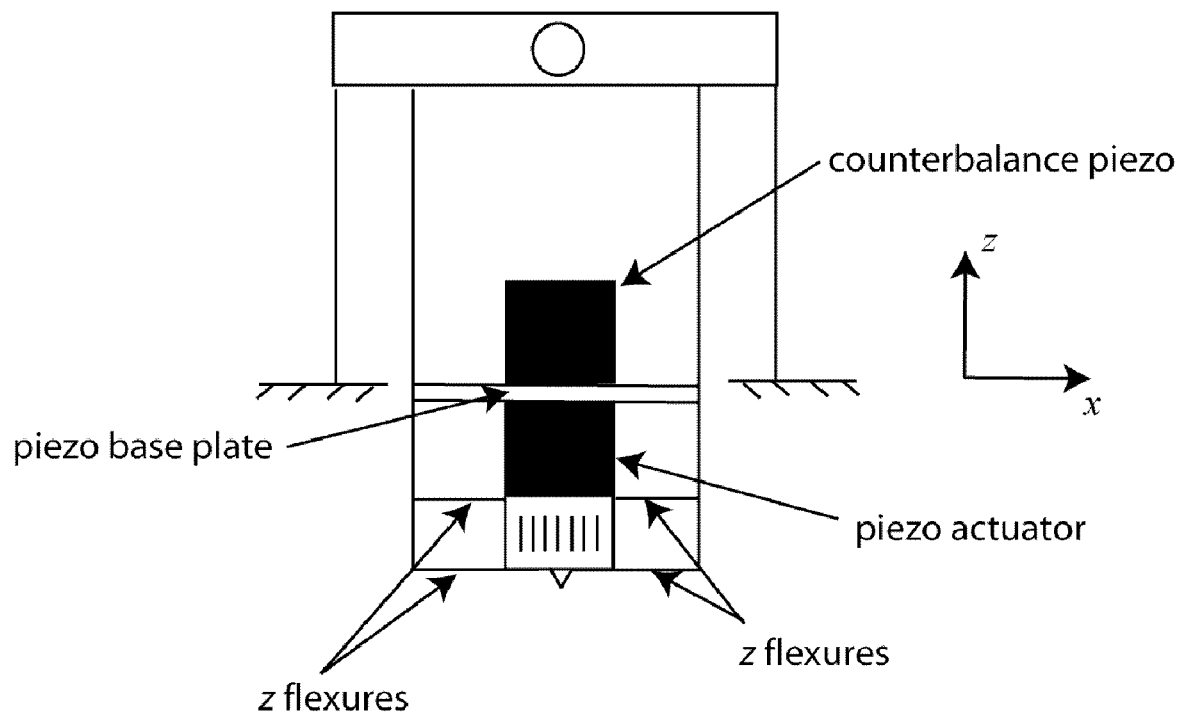
FIG. 37 is a schematic diagram illustrating an actuator scheme using a magnet+coil to drive the x-axis and a piezoelectric stack actuator to drive the z-axis

FIG. 37 is a schematic diagram illustrating an actuator scheme using a magnet+coil to drive the x-axis and a piezoelectric stack actuator to drive the z-axis. FIG. 37 is an embodiment employing multiple actuator types. A Lorentz actuator (not shown) is used to drive the x-axis at the upper mass. A piezoelectric stack is used to drive the z-axis at the lower mass. An additional piezoelectric stack can be added to provide a counterbalance force, i.e., the large reaction forces provided by the main piezo stack are canceled out by the other piezo stack, so that they are not transmitted to the rest of the scanner structure. The embodiment can also be used without this counterbalance piezoelectric stack.

The x-axis is driven by a Lorentz actuator in the conventional manner described previously. The z flexures are attached to the bottom mass instead of the top mass. The actuating piezo is bonded (via glue for instance) to a base plate, which in turn is connected to the inner flexures and moves with them. A voltage is applied to the actuating piezo via a voltage drive (not shown). This causes the piezo to expand in the vertical direction (z-direction) and produce a z-directed force on the bottom mass. The use of piezoelectric actuators is well known in the field. An identical voltage can be applied to an additional identical piezoelectric actuator (the counterbalance piezo), oriented opposite to the actuating piezo. This causes the counterbalance piezo to expand in the opposite direction. This results in an equal and opposite reaction force to that from the actuating piezo on the base plate, so that no reaction forces are transmitted to the rest of the mechanical flexure suspension.

One of the advantages of this embodiment is that since the z flexures are located at the bottom mass, moments produced at the top mass will have much less effect on parasitic rotation and z-motion of the tip. Another advantage is that the z-actuation is much closer to the point of interest (the tip), and so control of the z-axis will be easier. Finally, since the piezo actuator is only moving the bottom mass, and not both the top and bottom masses as in some other embodiments, less force is needed to control the z-axis motion.

Figure 38:
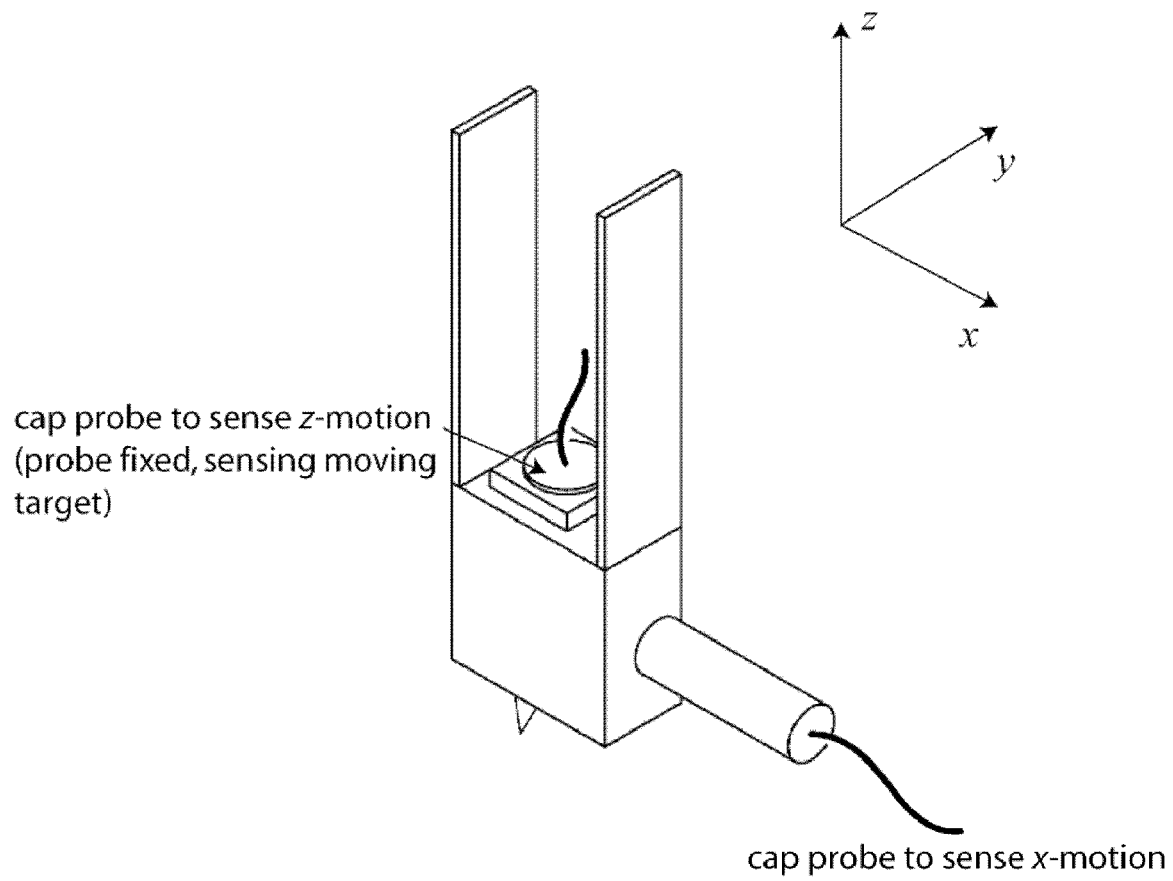
FIG. 38 is a schematic diagram illustrating a z-axis capacitive probe located above a lower mass.

FIG. 38 is a schematic diagram illustrating a z-axis capacitive probe located above a lower mass. The z-axis cap probe measures the upper side of the lower mass. This allows the tip in an SPM configuration (located on the bottom side of the lower mass) to be unobstructed by sensors.

Figure 39A:
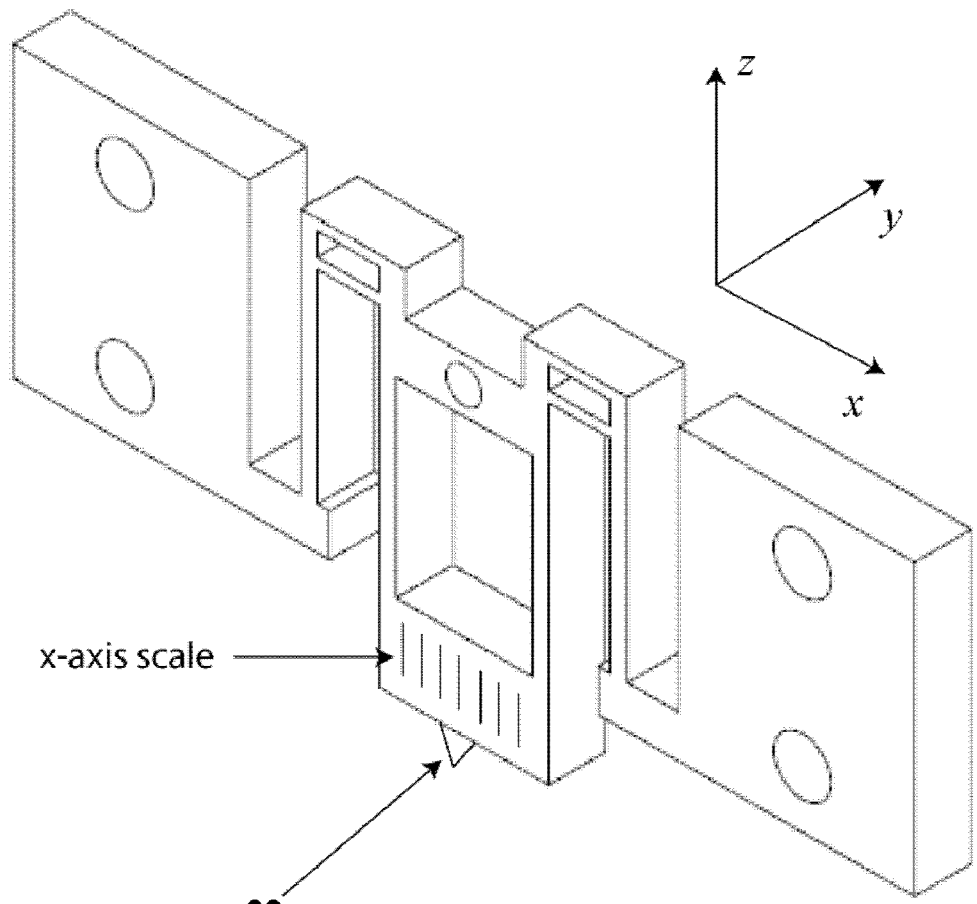
FIG. 39A and FIG. 39B are schematic diagrams illustrating the use of linear scales on a mechanical flexure suspension to provide tip scanner metrology, where FIG. 39A provides a front view and FIG. 39B provides a backside view.
Figure 39B:
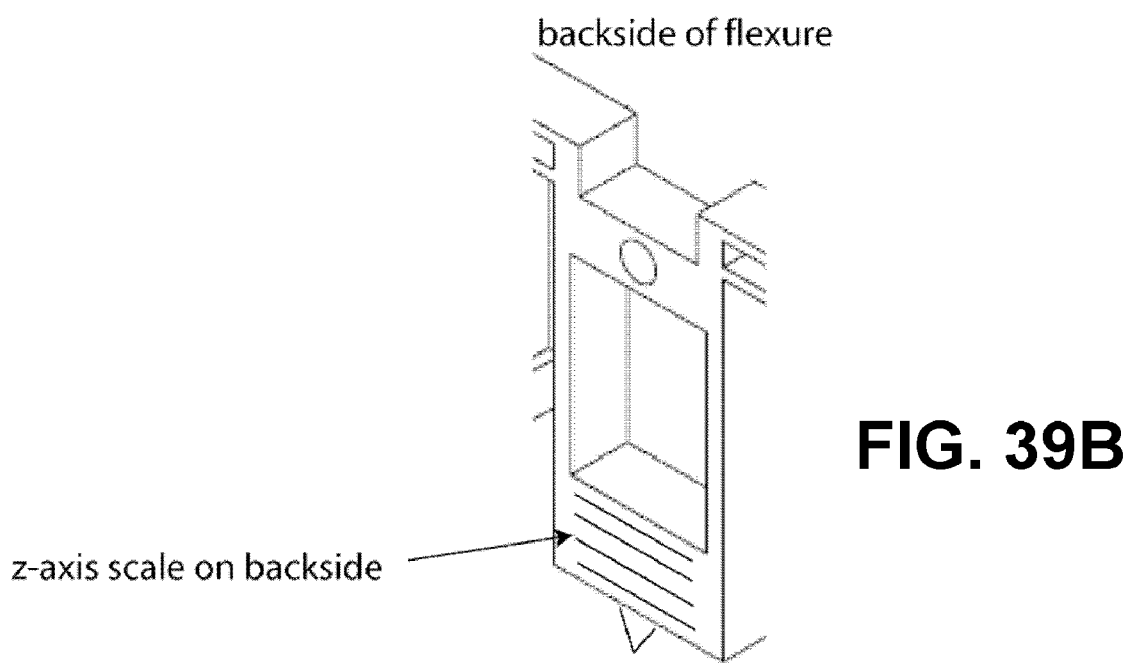

FIG. 39A and FIG. 39B are schematic diagrams illustrating the use of linear scale encoders on a mechanical flexure suspension 24 to provide tip scanner metrology, where FIG. 39A provides a front view and FIG. 39B provides a backside view. The linear scales provide a periodic diffraction pattern that can be calibrated to position. By being placed on the front and back sides of the lower mass, the linear scales can be kept out of the way of the probe tip 22.

The operation of linear encoders is well known in the art. A stationary read head (not shown) placed close to the scales (but not attached to the flexure) picks up the periodic diffraction pattern produced by the scales as the tip moves back and forth or up and down.

The linear scale encoders can be placed near the tip for more accurate sensing. The scales can be made with very fine pitch in order to provide very high resolution position sensing. Another advantage of linear encoders is that the flexure material does not have to be conductive as with capacitive sensing. This permits more leeway in selecting the flexure material.

Linear encoders are also conducive to MEMS design, since conventional MEMS fabrication techniques can be used to deposit the encoder scales on to the structure.

Figure 40:
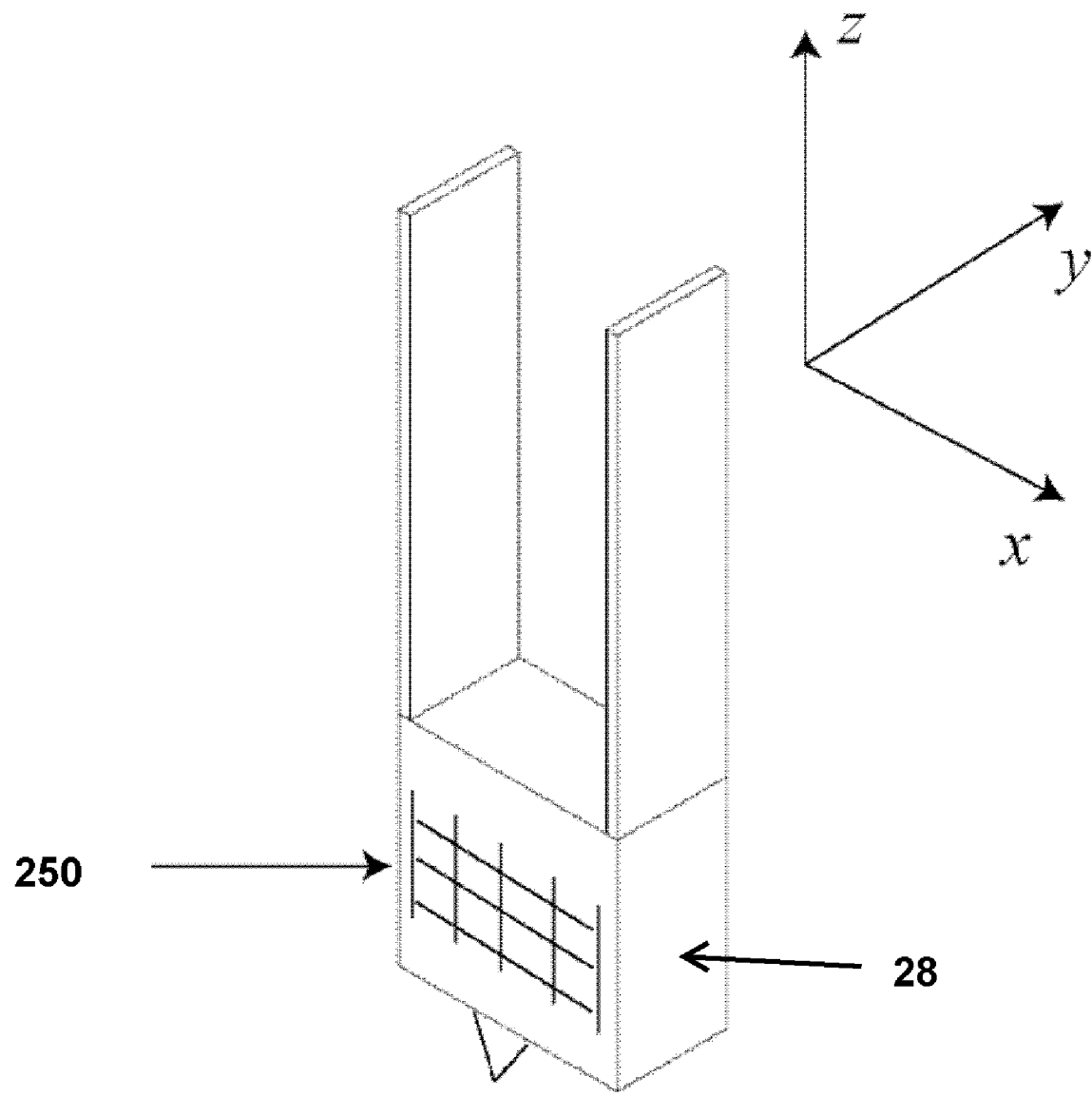
FIG. 40 is a schematic diagram illustrating the use of grid scales on the lower mass to provide tip scanner metrology.

Alternatively, FIG. 40 is a schematic diagram illustrating the use of a grid scale encoder 250 on the lower mass 28 to provide tip scanner metrology. The two dimensional scales are used to provide metrology in both the x-axis and the z-axis. Unlike the sensing scheme of FIG. 40, only one grid scan 250 is used in the configuration of FIG. 40 for both degrees of freedom, rather that two separate linear scales.

The operation of grid scales is well known in the art. A stationary read head (not shown) placed close to the scales (but not attached to the flexure) picks up the periodic diffraction pattern produced by the scales as the tip moves back and forth or up and down. The vertically-directed scales provide the diffraction pattern for sensing x-position, and the horizontally-directed scales provide the diffraction pattern for sensing z-position.

The grid scale encoders can be placed near the tip for more accurate sensing. As with the separate linear encoders, grid scale encoders are also conducive to MEMS design, since conventional MEMS fabrication techniques can be used to deposit the encoder scales on to the structure.

Figure 41:
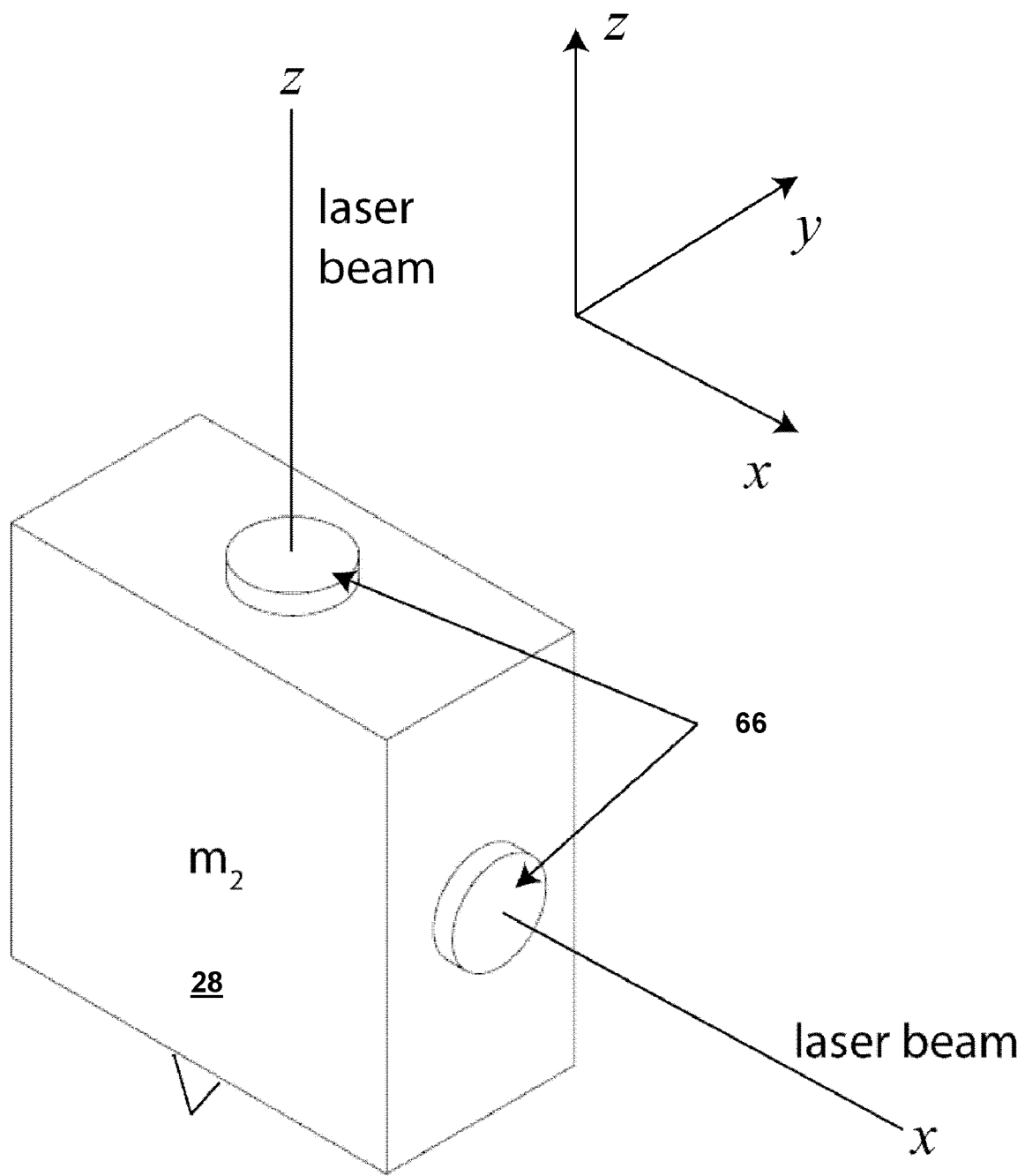
FIG. 41 is a schematic diagram showing laser interferometry as a sensing implementation.

FIG. 41 is a schematic diagram showing laser interferometry as a sensing implementation. Laser interferometry can be used to sense the x-axis and z-axis motions. For laser interferometry, mirrors 66 are placed on the lower mass 28. Corner cubes can be used instead of mirrors if desired. A laser beam is pointed at the mirror and the interference pattern between the laser beam and the return beam from the mirror is used to determine the position of the lower mass 28.

Laser interferometry provides accurate position sensing. One advantage it presents is that the instrumentation and optics associated with the interferometry can be located far from the flexure itself and thus out of the way of any tip. This is in contrast to capacitance probes, which must be located very near the sensing surface, and in contrast to linear scales, which require a read head very close to the sensing surface.

It should be noted that laser interferometry can provide metrology in all six degrees of freedom. An example of laser interferometry working in six degrees of freedom is provided by the schematic diagram of FIG. 42. Sensing all six degrees of freedom can provide more accurate imaging since the precise location of the probe tip can be more accurately known. The configuration of FIG. 42 allows all six degrees of freedom to be sensed via laser interferometry using mirrors or corner cubes.

Figure 42:
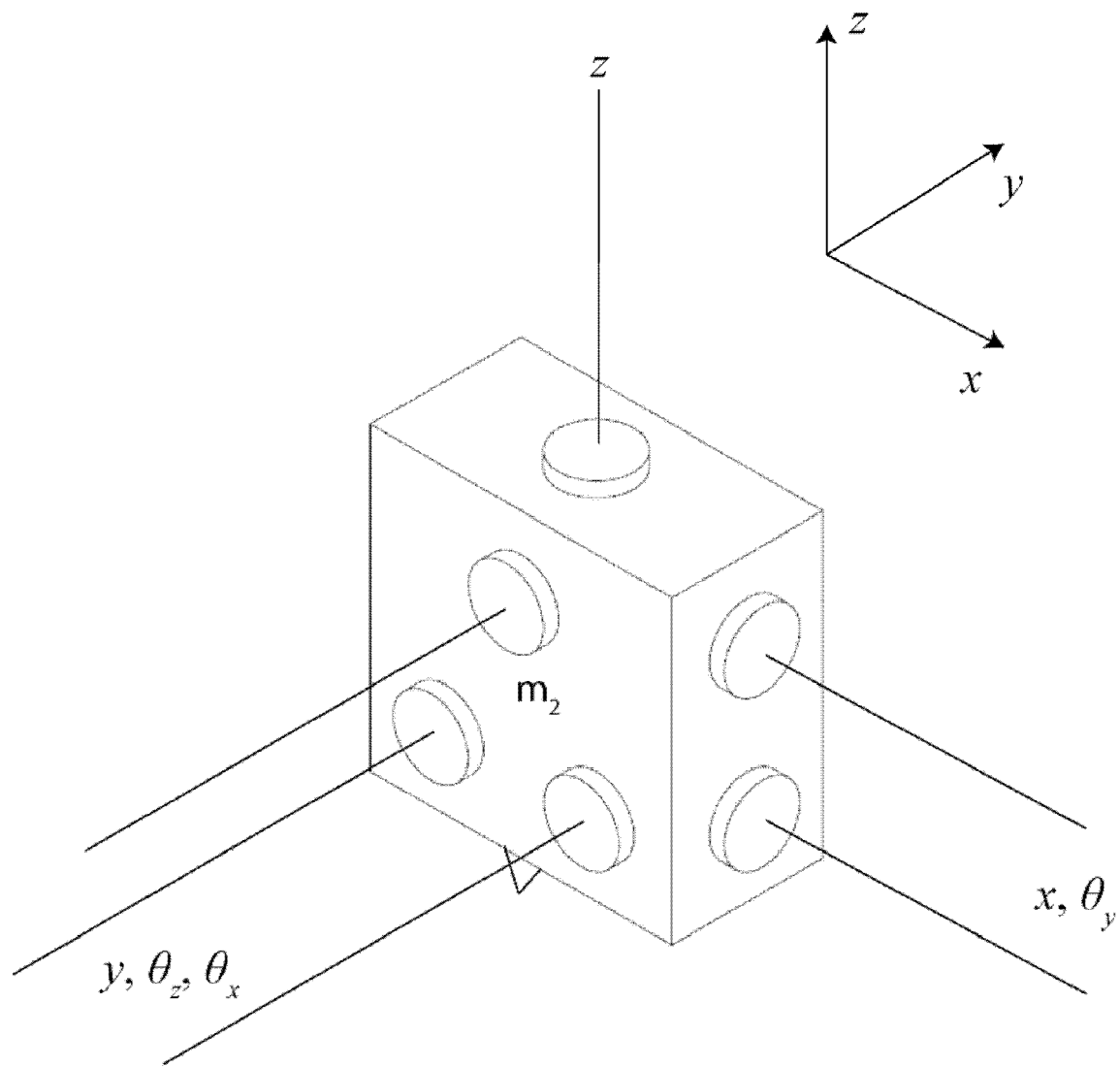
FIG. 42 is a schematic diagram showing laser interferometry working in six degrees of freedom.

Referring to FIG. 42, the two mirrors on the right side of the lower mass together provide measurements for the x-axis and for rotation about the y-axis, $\theta_y$. The three mirrors on the front together provide measurements for y-axis motion and for rotation about the x-axis ($\theta_x$) and for rotation about the z-axis ($\theta_z$). The mirror on the top surface provides measurement for z-axis motion.

Figure 43:
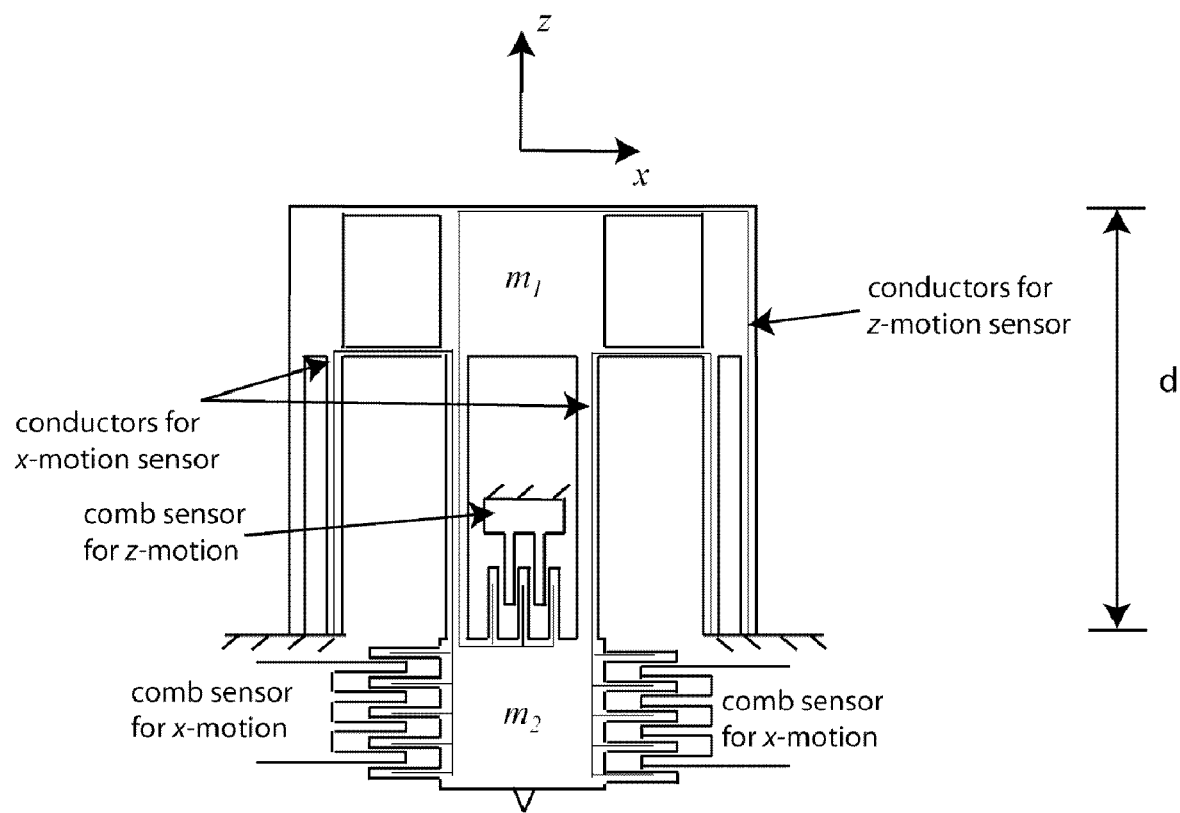
FIG. 43 is a schematic diagram showing use of electrostatic comb sensors to provide metrology.

FIG. 43 is a schematic diagram showing use of electrostatic comb sensors to provide metrology. This is similar to what is shown in FIG. 36, except that the comb structures are now used as sensors rather than actuators. The movement of the combs relative to each other induces a relative voltage between the comb sets due to the changing capacitance between adjacent fingers. Thus, position can be calibrated from the voltage changes. As with the electrostatic actuation, electrostatic sensing, as is known in the art, is amenable to MEMS design in silicon.

Conductors (equivalent to wires) are deposited on the comb fingers of the flexure to provide the capacitance capability. These conductors are brought out via the flexures, where they are connected to an instrumentation circuit (not shown) to measure the charge or voltage on the conductors. The instrumentation circuit can be placed far away from the flexure structure. MEMS fabrication processes are well known and would be very amenable to making the electrostatic sensors and conductors shown above. The MEMS structure can be made very compact, which results in high structural resonant frequencies, which in turns increases the speed of scanning. The dimension d for instance can be on the order of 1 mm to 10 mm. As with the embodiment shown in FIG. 36, the electrostatic comb sensors can dual as actuators as well. This offers the advantage of a single compact packaging that provides for both actuation and sensing.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A system for scanning at a high scan rate, comprising:
a first actuator half containing a first pair of actuator coils and a second pair of actuator coils located above the first pair of actuator coils, wherein the first pair of actuator coils is connected to a first metallic backing;
a second actuator half containing a first pair of actuator coils and a second pair of actuator coils located above the first pair of actuator coils, wherein the first pair of actuator coils is connected to a second metallic backing; and
a mechanical flexure suspension containing at least one flexure supporting a permanent magnet that is capable of moving, wherein the mechanical flexure suspension is located between the first actuator half and the second actuator half.

2. The system of claim 1, wherein currents from the first pair of actuator coils of the first actuator half and currents from the second pair of actuator coils of the first actuator half reinforce each other in a center in order to generate a force on the permanent magnet.

3. The system of claim 1, wherein current interacts with the magnetic field of the permanent magnet to provide Lorentz forces, $F_x$ and $F_z$, on the permanent magnet that are orthogonal to both the current direction and the magnetic field direction.

4. The system of claim 1, wherein the mechanical flexure suspension is constructed using microelectromechanical systems.

5. The system of claim 1, wherein actuator coils of the first actuator half and actuator coils of the second actuator half are identical.

6. The system of claim 1, wherein the mechanical flexure contains a second permanent magnet.

7. The system of claim 1, wherein the mechanical flexure suspension contains a mass having a probe tip thereon.

8. The system of claim 1, wherein the first actuator half further comprises a plate with flow-channels located beneath the first pair of actuator coils, wherein the flow-channels provide cooling to lower coils.

9. The system of claim 8, wherein the second actuator half further comprises a second plate with second flow-channels located beneath the first pair of actuator coils, wherein the flow-channels provide cooling to lower coils.

10. The system of claim 1, wherein the mechanical flexure suspension contains a double flexure configuration.

* * * * *